(12) United States Patent
Sakai et al.

(10) Patent No.: US 7,975,230 B2
(45) Date of Patent: Jul. 5, 2011

(54) INFORMATION-PROCESSING APPARATUS, INFORMATION-PROCESSING METHODS, RECORDING MEDIUMS, AND PROGRAMS

(75) Inventors: Yusuke Sakai, Kanagawa (JP); Naoki Saito, Kanagawa (JP); Mikio Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 994 days.

(21) Appl. No.: 11/179,560

(22) Filed: Jul. 13, 2005

(65) Prior Publication Data
US 2006/0026207 A1 Feb. 2, 2006

(30) Foreign Application Priority Data

Jul. 27, 2004 (JP) ................................ 2004-218532

(51) Int. Cl.
G06F 3/00 (2006.01)
G06F 15/16 (2006.01)
(52) U.S. Cl. ......................... 715/753; 709/217; 709/231
(58) Field of Classification Search .................. 707/104; 709/217

See application file for complete search history.

(56) References Cited

U.S. PATENT DOCUMENTS

| | | | |
|---|---|---|---|
| 5,963,246 A * | 10/1999 | Kato | 348/14.09 |
| 6,477,239 B1 * | 11/2002 | Ohki et al. | 379/52 |
| 2005/0128283 A1 * | 6/2005 | Bulriss et al. | 348/14.1 |
| 2006/0004914 A1 * | 1/2006 | Kelly et al. | 709/219 |
| 2007/0156513 A1 * | 7/2007 | Mastrianni et al. | 705/14 |
| 2008/0010365 A1 * | 1/2008 | Schneider | 709/223 |

FOREIGN PATENT DOCUMENTS

| | | |
|---|---|---|
| JP | 6-62400 | 3/1994 |
| JP | 7-336660 | 12/1995 |
| JP | 2002-118832 | 4/2002 |
| JP | 2003-111106 | 4/2003 |
| JP | 2003-163906 | 6/2003 |
| JP | 2004-088327 | 3/2004 |

(Continued)

OTHER PUBLICATIONS

Deshpande et al, "A real time interactive virtual classroom multimedia distance learning system", IEEE transction on multimedia.Dec. 2001.*

(Continued)

*Primary Examiner* — Pierre M Vital
*Assistant Examiner* — Sabana Rahman
(74) *Attorney, Agent, or Firm* — Oblon, Spivak, McClelland, Maier & Neustadt, L.L.P.

(57) ABSTRACT

The present invention provides an information-processing apparatus including reproduction means for synchronously reproducing content data common to an other information-processing apparatus, user information input means for inputting first user condition information including a voice and image of a user, user information receiver means for receiving second user condition information including a voice and image of an other user from the other information-processing apparatus, synthesis means for synthesizing a voice and image of the content data synchronously reproduced by the reproduction means with the voice and image of the second user condition information received by the user-information receiver means; information analysis means for analyzing at least either the first user condition information input by the user-information input means or the second user condition information received by the user-information receiver means, and parameter-setting means for setting a control parameter used for controlling a process, which is carried out by the synthesis means to synthesize voices and images, on the basis of an analysis result produced by the information analysis means.

17 Claims, 15 Drawing Sheets

FOREIGN PATENT DOCUMENTS

WO WO 00/22823 4/2000

OTHER PUBLICATIONS

U.S. Appl. No. 11/572,593, filed Jan. 24, 2007, Saito, et al.
U.S. Appl. No. 11/658,476, filed Jan. 25, 2007, Saito, et al.
U.S. Appl. No. 11/572,597, filed Jan. 24, 2007, Sakai, et al.
U.S. Appl. No. 11/658,833, filed Jan. 29, 2007, Saito, et al.
U.S. Appl. No. 11/133,656.
U.S. Appl. No. 11/177,444, filed Jul. 11, 2005, Sakai et al.
U.S. Appl. No. 11/188,698, filed Jul. 26, 2005, Saito et al.
U.S. Appl. No. 11/188,837, filed Jul. 26, 2005, Sakai et al.
Office Action issued Nov. 25, 2010, in Japanese Patent Application No. 2004-218532.

* cited by examiner

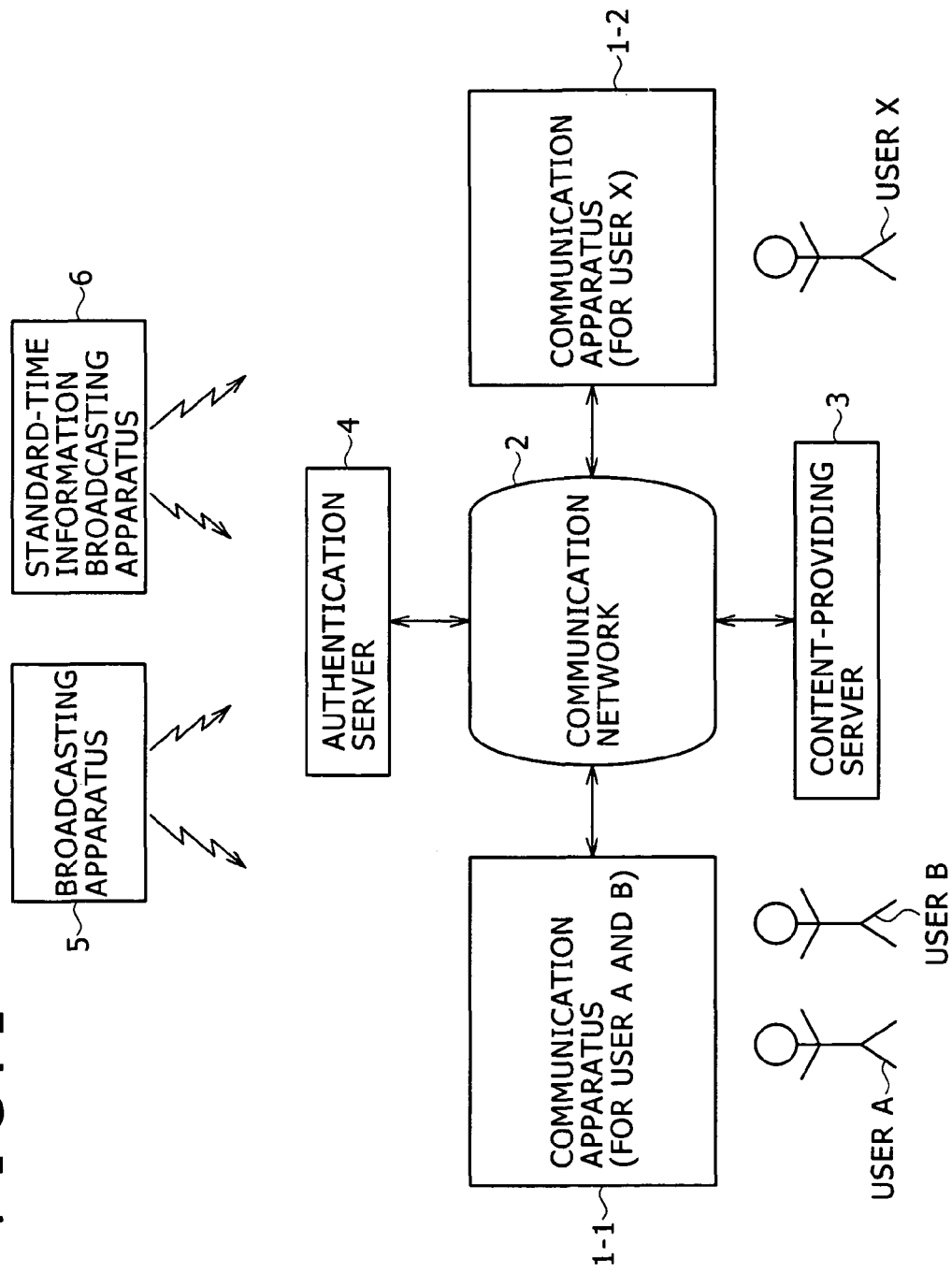

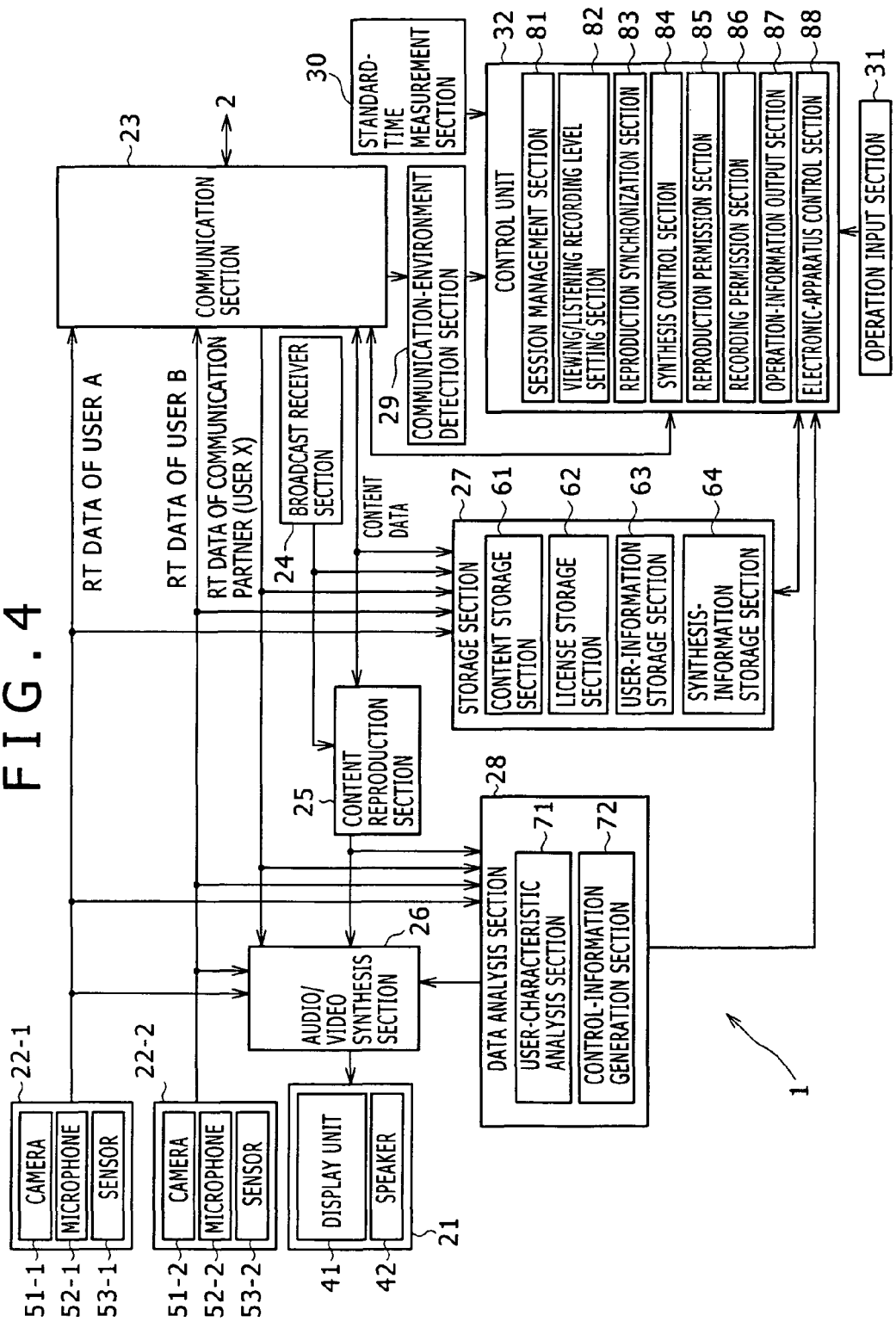

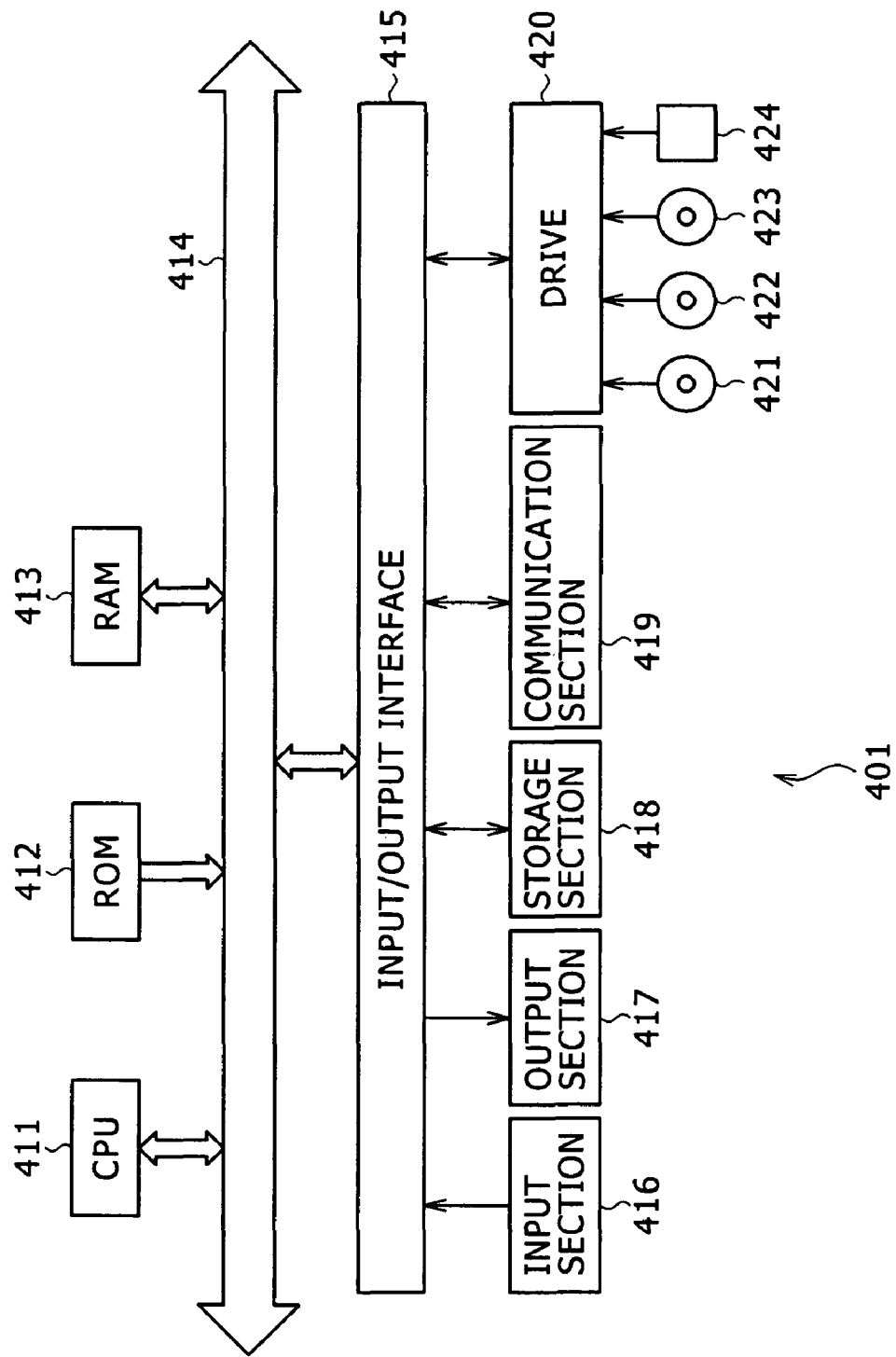

INFORMATION-PROCESSING APPARATUS, INFORMATION-PROCESSING METHODS, RECORDING MEDIUMS, AND PROGRAMS

CROSS REFERENCES TO RELATED APPLICATIONS

The present invention contains subject matter related to Japanese Patent Application JP 2004-218532 filed in the Japanese Patent Office on Jul. 27, 2004, the entire contents of which being incorporated herein by reference.

BACKGROUND OF THE INVENTION

The present invention relates to information-processing apparatus, information-processing methods, recording mediums, and programs. More particularly, the present invention relates to information-processing apparatus, information-processing methods, programs, and recording mediums, which are connected to each other by a network, used for synthesizing a content common to the apparatus with voices and images of users operating the apparatus and used for reproducing a analysis result synchronously.

The apparatus in related art used in interactions with people at locations remotely separated from each other include the telephone, the so-called TV telephone, and a video conference system. There is also a method whereby personal computers or the like are connected to the Internet and used for chats based on texts and video chats based on images and voices. Such interactions are referred to hereafter as remote communications.

In addition, there has also been proposed a system wherein persons each carrying out remote communications with each other share a virtual space and the same contents through the Internet by using personal computers or the like connected to the Internet. For more information on such a system, refer to documents such as Japanese Patent Laid-open No. 2003-271530.

SUMMARY OF THE INVENTION

In the method in related art allowing users at locations remotely separated from each other to share the same content, however, the users communicate with each other by transmission of mainly information written in a language. Thus, the method in related art has a problem of difficulties to express the mind and situation of a user to another user in comparison with the face-to-face communication in which the user is actually facing the communication partner.

In addition, the method in related art whereby the user can view an image of the communication partner and listen to a voice of the partner along with the same content shared with the partner has a problem of difficulties to operate the apparatus in order to optimally synthesize the image and voice of the partner with the image and sound of the content by manual operations or the like, which are carried out by the user, due to complexity of the apparatus.

Addressing the problems described above, inventors of the present invention have devised a technique capable of setting a synthesis of a plurality of images and a plurality of sounds with ease in accordance with the conditions of users in a process carried out by the users to view and listen to the same content at locations remote from each other.

In accordance with an embodiment of the present invention, there is provided an information-processing apparatus including:

reproduction means for reproducing content data common to the information-processing apparatus and the other information-processing apparatus synchronously with the other information-processing apparatus;

user information input means for inputting first user condition information including a voice and image of a user operating the information-processing apparatus;

user information receiver means for receiving second user condition information including a voice and image of another user from the other information-processing apparatus operated by the other user;

synthesis means for synthesizing a voice and image of the content data synchronously reproduced by the reproduction means with the voice and image of the second user condition information received by the user-information receiver means;

information analysis means for analyzing at least either the first user condition information input by the user-information input means or the second user condition information received by the user-information receiver means; and parameter-setting means for setting a control parameter used for controlling a process, which is carried out by the synthesis means to synthesize voices and images, on the basis of an analysis result produced by the information analysis means.

In accordance with an embodiment of the present invention, it is also possible to provide a configuration in which the first user condition information also includes information on the environment of the user whereas the second user condition information also includes information on the environment of the other user.

The information-processing apparatus according to an embodiment of the present invention further includes analysis-object determination means for generating a determination result as to whether or not the second user condition information received by the user-information receiver means is to be analyzed by the information analysis means and, if the determination result produced by the analysis-object determination means indicates that the second user condition information is not to be analyzed by the information analysis means, the information analysis means analyzes only the first user condition information.

The information-processing apparatus according to an embodiment of the present invention further includes output means for outputting a voice and an image, which are obtained as a synthesis result carried out by the synthesis means, wherein the parameter-setting means sets a control parameter of the output means on the basis of an analysis result carried out by the information analysis means.

It is also possible to provide a configuration in which the parameter-setting means sets a control parameter of an electronic apparatus, which is connected to the information-processing apparatus, on the basis of an analysis result carried out by the information analysis means.

It is also possible to provide a configuration in which the parameter-setting means sets a control parameter of the other information-processing apparatus on the basis of an analysis result carried out by the information analysis means, and the information-processing apparatus further includes sender means for transmitting the control parameter set by the parameter-setting means to the other information-processing apparatus.

The information-processing apparatus according to an embodiment of the present invention further includes acceptance determination means for generating a determination result as to whether or not a control parameter transmitted by the other information-processing apparatus is to be accepted.

According to an embodiment of the present invention, there is provided an information-processing method including the steps of:

reproducing content data common to the information-processing apparatus and the other information-processing apparatus synchronously with the other information-processing apparatus;

inputting first user condition information including a voice and image of a user operating the information-processing apparatus;

receiving second user condition information including a voice and image of an other user from the other information-processing apparatus operated by the other user;

synthesizing a voice and image of the content data synchronously reproduced in a process carried out at the reproduction step with the voice and image of the second user condition information received in a process carried out at the user-information receiver step;

analyzing at least either the first user condition information input in a process carried out at the user-information input step or the second user condition information received in a process carried out at the user-information receiver step; and setting a control parameter used for controlling a process, which is carried out at the information synthesis step of synthesizing voices and images, on the basis of an analysis result produced in a process carried out at the information analysis step.

According to an embodiment of the present invention, there is provided a recording medium for recording a program as a recording medium. The program includes the steps of:

reproducing content data common to the computer and the information-processing apparatus synchronously with the information-processing apparatus;

inputting first user condition information including a voice and image of a user operating the computer;

receiving second user condition information including a voice and image of an other user from the information-processing apparatus operated by the other user;

synthesizing a voice and image of the content data synchronously reproduced in a process carried out at the reproduction step with the voice and image of the second user condition information received in a process carried out at the user-information receiver step;

analyzing at least either the first user condition information input in a process carried out at the user-information input step or the second user condition information received in a process carried out at the user-information receiver step; and setting a control parameter used for controlling a process, which is carried out at the information synthesis step of synthesizing voices and images, on the basis of an analysis result produced in a process carried out at the information analysis step.

According to an embodiment of the present invention, there is provided a program including the steps of:

reproducing content data common to the computer and the information-processing apparatus synchronously with the information-processing apparatus;

inputting first user condition information including a voice and image of a user operating the computer;

receiving second user condition information including a voice and image of an other user from the information-processing apparatus operated by the other user;

synthesizing a voice and image of the content synchronously reproduced in a process carried out at the reproduction step with the voice and image of the second user condition information received in a process carried out at the user-information receiver step;

analyzing at least either the first user condition information input in a process carried out at the user-information input step or the second user condition information received in a process carried out at the user-information receiver step; and setting a control parameter used for controlling a process, which is carried out at the information synthesis step of synthesizing voices and images, on the basis of an analysis result produced in a process carried out at the information analysis step.

According to an embodiment of the present invention, there is provided an information-processing apparatus including:

a reproduction section for reproducing content data common to the information-processing apparatus and the other information-processing apparatus synchronously with the other information-processing apparatus;

a user information input section for inputting first user condition information including a voice and image of a user operating the information-processing apparatus;

a user information receiver section for receiving second user condition information including a voice and image of an other user from the other information-processing apparatus operated by the other user;

a synthesis section for synthesizing a voice and image of the content data synchronously reproduced by the reproduction section with the voice and image of the second user condition information received by the user-information receiver section;

an information analysis section for analyzing at least either the first user condition information input by the user-information input section or the second user condition information received by the user-information receiver section; and a parameter-setting section for setting a control parameter used for controlling a process, which is carried out by the synthesis section to synthesize voices and images, on the basis of an analysis result produced by the information analysis section.

As described above, in this present invention, a content common to an information-processing apparatus and another information-processing apparatus is reproduced in the information-processing apparatus synchronously with the other information-processing apparatus. Then, first user condition information including a voice and image of a user operating the information-processing apparatus is input. Subsequently, second user condition information including a voice and image of another user is received from the other information-processing apparatus operated by the other user. Then, a voice and image of the synchronously reproduced content are synthesized with the voice and image of the second user condition information. Subsequently, at least either the input first user condition information or the received second user condition information is analyzed. Finally, a control parameter used for controlling a process to synthesize voices and images is set on the basis of the analysis result.

A network is a mechanism for connecting at least two apparatus to each other and propagating information from one apparatus to another. Apparatus communicating with each other through the network can be independent apparatus or internal blocks included in one apparatus.

Communication can of course be radio or wire communication. As an alternative, communication can also be a combination of the radio communication and the wire communication, which are mixed with each other. That is to say, the radio communication is adopted for certain areas while the wire communication is carried out for other areas. As an alternative, the radio communication and the wire communication are mixed with each other by applying the radio communication to communications from a certain apparatus to another apparatus but applying the wire communication to communications from the other apparatus to the certain apparatus.

In accordance with an embodiment of the present invention, a synthesis of a plurality of images and a plurality of voices can be set with ease in accordance with the conditions of users. In addition, in accordance with an embodiment of the present invention, users present at locations remote from each other are capable of communicating with each other in a lively manner.

BRIEF DESCRIPTION OF THE DRAWINGS

These and other objects of the invention will be seen by reference to the description, taken in connection with the accompanying drawings, in which:

FIG. 1 is a diagram showing a typical configuration of a communication system according to an embodiment of the present invention;

FIG. 4 is a block diagram showing a typical configuration of a communication apparatus employed in the communication system shown in FIG. 1;

FIG. 15 is a block diagram showing a typical configuration of a personal computer according to an embodiment of the present invention.

DETAILED DESCRIPTION OF THE PREFERRED EMBODIMENTS

Figure 2A:
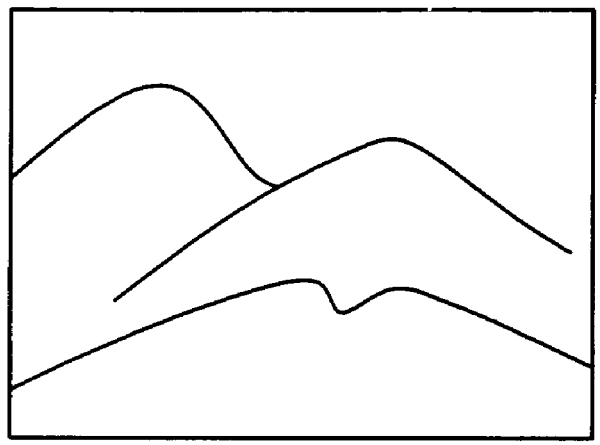
FIGS. 2A to 2C are diagrams showing a typical image of a content and typical images of users in the communication system shown in FIG. 1.

Before preferred embodiments of the present invention are explained, relations between disclosed inventions and the embodiments are explained in the following comparative description. Even if there is an embodiment described in this specification but not included in the following comparative description as an embodiment corresponding to an invention, such an embodiment is not to be interpreted as an embodiment not corresponding to an invention. Conversely, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification, or added in the future.

An information-processing apparatus (such as a communication apparatus 1-1 as shown in FIG. 1) according to an embodiment of the present invention includes:

reproduction means (such as a content reproduction section 25 as shown in FIG. 4) for reproducing content data common to this information-processing apparatus and an other information-processing apparatus (such as a communication apparatus 1-2 shown in FIG. 1) synchronously with the other information-processing apparatus;

user-information input means (such as an input section 22-1 as shown in FIG. 4) for inputting first user condition information including a voice and image of a user operating this information-processing apparatus;

user-information receiver means (such as a communication section 23 as shown in FIG. 4) for receiving second user condition information including a voice and image of an other user from the other information-processing apparatus operated by the other user;

synthesis means (such as an audio/video synthesis section 26 as shown in FIG. 4) for synthesizing a voice and image of the content synchronously reproduced by the reproduction means with the voice and image of the second user condition information received by the user-information receiver means;

information analysis means (such as a user-characteristic analysis section 71 as shown in FIG. 4) for analyzing at least either the first user condition information input by the user-information input means or the second user condition information received by the user-information receiver means; and parameter-setting means (such as a control-information generation section 72 as shown in FIG. 4) for setting a control parameter used for controlling a process, which is carried out by the synthesis means to synthesize voices and images, on the basis of an analysis result produced by the information analysis means.

It is also possible to provide a configuration in which the information-processing apparatus according to the embodiment of the present invention further includes analysis-object determination means (such as a synthesis control section 84 as shown in FIG. 4) for generating a determination result as to whether or not the second user condition information received by the user-information receiver means is to be analyzed by the information analysis means and, if the determination result generated by the analysis-object determination means indicates that the second user condition information is not to be analyzed by the information analysis means, the information analysis means analyzes only the first user condition information.

It is also possible to provide a configuration in which the information-processing apparatus according to the embodiment of the present invention further includes output means (such as an output section 21 as shown in FIG. 4) for outputting a voice and an image, which are obtained as a synthesis result carried out by the synthesis means, and on the basis of an analysis result carried out by the information analysis means, the parameter-setting means also sets a control parameter of the output means.

It is also possible to provide a configuration in which the parameter-setting means sets a control parameter for controlling the other information-processing apparatus on the basis of an analysis result carried out by the information analysis means and the information-processing apparatus according to the embodiment of the present invention further includes sender means (such as an operation-information output section 87 as shown in FIG. 4) for transmitting the control parameter set by the parameter-setting means to the other information-processing apparatus.

It is also possible to provide a configuration in which the information-processing apparatus according to the embodiment of the present invention further includes acceptance determination means (such as a session management section 81 as shown in FIG. 4) for generating a determination result as to whether or not a control parameter transmitted by the other information-processing apparatus is to be accepted.

Figure 5:
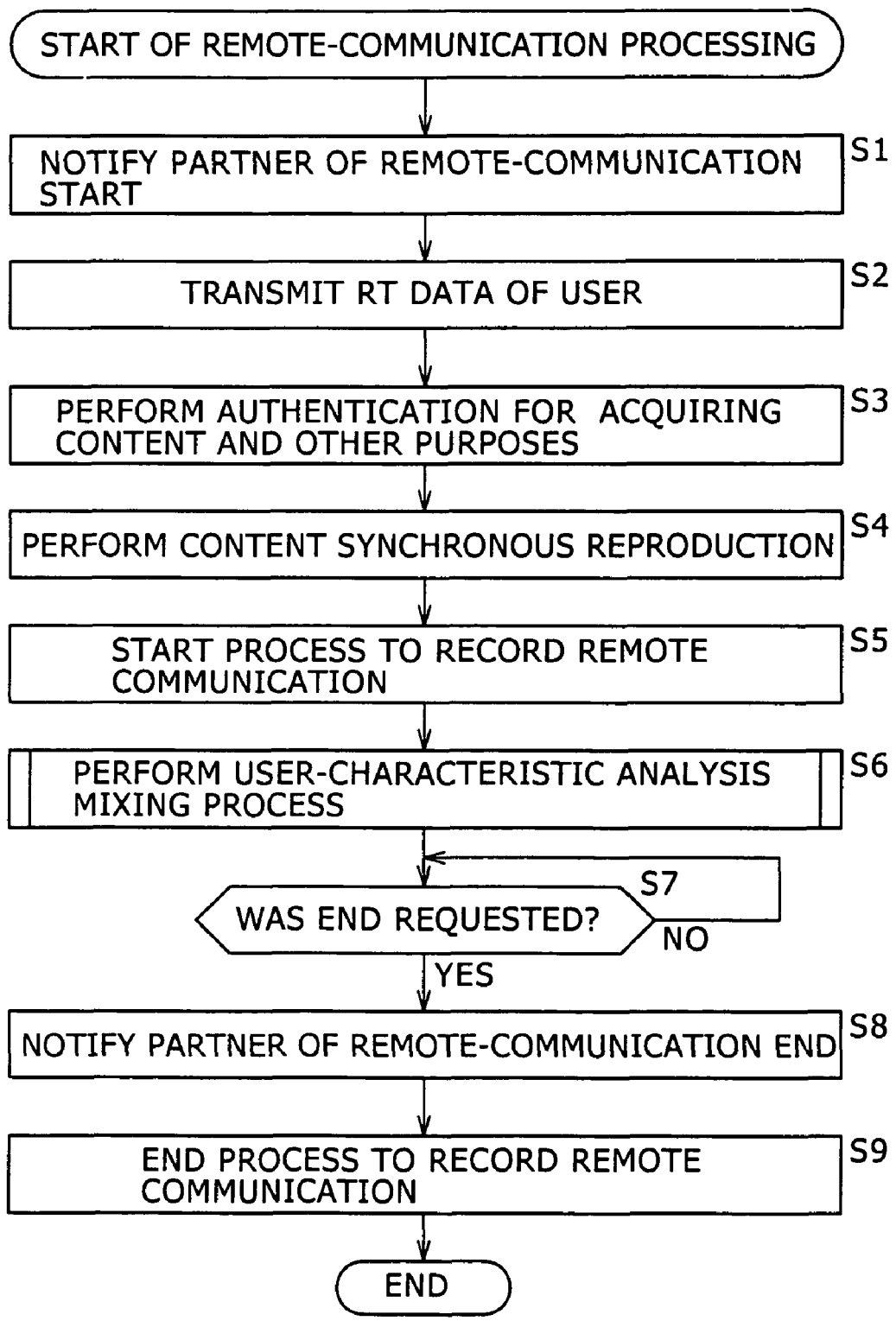
FIG. 5 shows a flowchart referred to in an explanation of remote communication processing carried out by the communication apparatus shown in FIG. 4.
Figure 13:
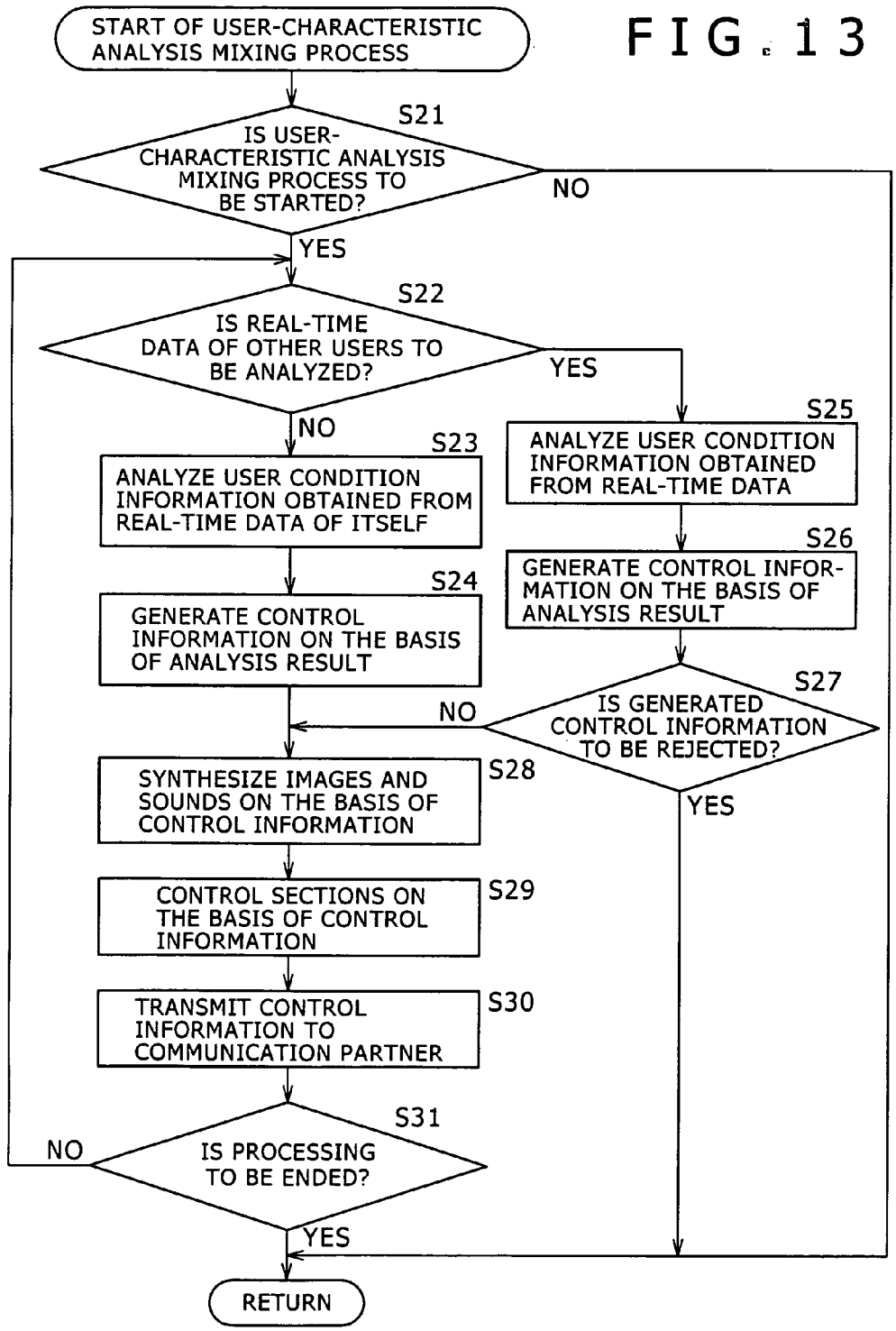
FIG. 13 shows a flowchart referred to in an explanation of a user-characteristic analysis mixing process carried out at a step S6 of the flowchart shown in FIG. 5.

An information-processing method according to an other embodiment of the present invention includes the steps of:

reproducing content data common to an information-processing apparatus and an other information-processing apparatus synchronously with the other information-processing apparatus (such as a step S4 of a flowchart shown in FIG. 5);

inputting first user condition information including a voice and image of a user operating the information-processing apparatus (such as a sub-step of carrying out a process in the input section 22-1 as shown in FIG. 4 at a step S2 of the flowchart shown in FIG. 5);

receiving second user condition information including a voice and image of an other user from the other information-processing apparatus operated by the other user (such as a sub-step of carrying out a process in the communication section 23 as shown in FIG. 4 at the step S2 of the flowchart shown in FIG. 5);

synthesizing a voice and image of the content data synchronously reproduced in a process carried out at the reproduction step with the voice and image of the second user condition information received in a process carried out at the user-information receiver step (such as a step S28 of a flowchart shown in FIG. 13);

analyzing at least either the first user condition information input in a process carried out at the user-information input step or the second user condition information received in a process carried out at the user-information receiver step (such as a step S23 of a flowchart shown in FIG. 13); and setting a control parameter used for controlling a process, which is carried out at the information synthesis step of synthesizing voices and images, on the basis of an analysis result produced in a process carried out at the information analysis step (such as a step S24 of a flowchart shown in FIG. 13).

It is to be noted that relations between a recording medium and a concrete implementation according to an embodiment of the present invention are the same as the relations described above as relations between the information-processing method and a concrete implementation in the embodiment. By the same token, relations between a program and a concrete implementation in the embodiment are the same as the relations described above as relations between the information-processing method and a concrete implementation in the embodiments. Thus, the relations between the recording mediums and the concrete implementation in the embodiment as well as the relations between the program and the concrete implementation in the embodiment are not explained to avoid duplications.

The embodiments of the present invention are explained in detail by referring to drawings as follows.

FIG. 1 is a diagram showing a typical configuration of a communication system according to an embodiment of the present invention. In this communication system, a communication apparatus 1-1 is connected to another communication apparatus 1 through a communication network 2. In the case of the typical configuration shown in FIG. 1, a communication apparatus 1-2 serves as the other communication apparatus 1. The communication apparatus 1-1 and 1-2 exchange images of their users as well as user voices accompanying the images with each other in a way similar to the so-called television telephone. In addition, the communication apparatus 1-1 reproduces a content common to the communication apparatus 1-1 and 1-2 synchronously with the communication apparatus 1-2. By displaying a common content in this way, remote communication between users is supported. In the following descriptions, the communication apparatus 1-1 and 1-2 are each referred to simply as the communication apparatus 1 in case it is not necessary to distinguish the communication apparatus 1-1 and 1-2 from each other.

It is to be noted that examples of the common content are a program content obtained as a result of receiving a television broadcast, the content of an already acquired movie or the like obtained by downloading, a private content exchanged between users, a game content, a musical content and a content prerecorded on an optical disk represented by a DVD (Digital Versatile Disk). It is to be noted that the optical disk itself is not shown in the figure.

The communication apparatus 1 can be utilized by a plurality of users at the same time. In the case of the typical configuration shown in FIG. 1, for example, the communication apparatus 1-1 is utilized by users A and B whereas the communication apparatus 1-2 is utilized by a user X.

Figure 2B:
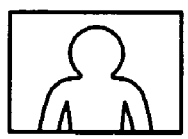
Figure 2C:
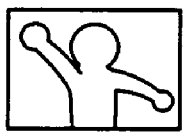

As an example, an image of a common content is shown in FIG. 2A. An image taken by the communication apparatus 1-1 is an image of the user A like one shown in FIG. 2B. On the other hand, an image taken by the communication apparatus 1-2 is an image of the user X like one shown in FIG. 2C. In this case, a display unit 41 employed in the communication apparatus 1-1 as shown in FIG. 4 displays a picture-in-picture screen like one shown in FIG. 3A, a cross-fade screen like one shown in FIG. 3B, or a wipe screen like one shown in FIG. 3C. In either case, the image of the common content and the images of the users are superposed on each other.

Figure 3A:
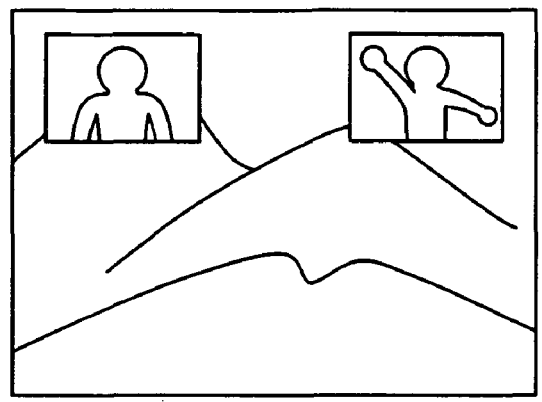
FIGS. 3A to 3C are diagrams showing typical patterns of synthesis of a content image with user images.

On the picture-in-picture display like the one shown in FIG. 3A, the images of the users are each superposed on the image of the common content as a small screen. The position and size of each of the small screens can be changed in an arbitrary manner. In addition, instead of displaying the images of both the users, that is, instead of displaying the image of the user A itself and the image of the user X serving as a communication partner of the user A, only the image of either of the users can be displayed.

Figure 3B:
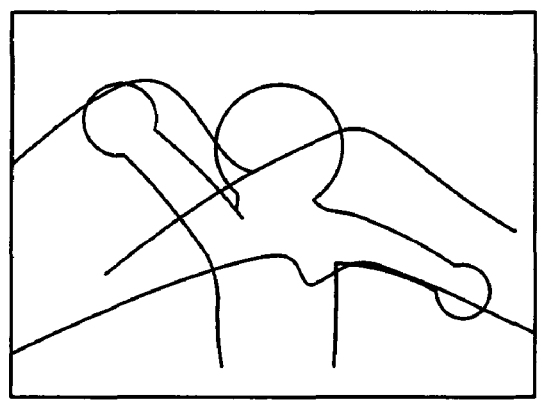

In the cross-fade screen like the one shown in FIG. 3B, the image of the common content is synthesized with the image of a user, which can be the user A or X. This cross-fade screen can be used for example when the user points to an arbitrary position or area on the image of the common content.

Figure 3C:
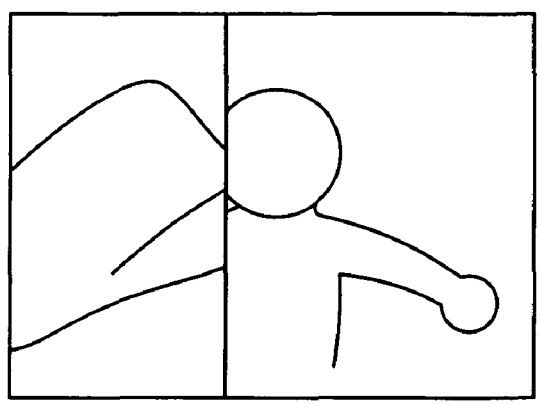

In the wipe screen like the one shown in FIG. 3C, the image of a user appears on the screen while moving in a certain direction, gradually covering the image of the common content. In the typical screen shown in FIG. 3C, the image of the user appears from the right side.

The above synthesis patterns of the screen can be changed from time to time. In addition, each of the synthesis patterns has synthesis parameters such as image balance to set the transparency of each image in the synthesis patterns shown in FIGS. 3A to 3C and volume balance to set the volumes of the content and the users. These synthesis parameters can also be changed from time to time. A history showing changes of the synthesis pattern from one to another and changes of the synthesis parameters is stored in a synthesis-information storage section 64 as shown in FIG. 4. It is to be noted that the pattern to display the image of the content and the images of the users is not limited to the synthesis patterns described above. That is to say, the images can also be displayed as a synthesis pattern other than the patterns described above.

Refer back to FIG. 1. The communication network 2 is a broad-band data communication network represented by typically the Internet. At a request made by the communication apparatus 1, a content-providing server 3 supplies a content to the communication apparatus 1 by way of the communication network 2. Before the user of the communication apparatus 1 can utilize the communication system, an authentication server 4 authenticates the user. In addition, the authentication server 4 also carries out an accounting process and other processing for a successfully authenticated user.

A broadcasting apparatus 5 is a unit for transmitting a content, which is typically a program of a television broadcast or the like. Thus, the communication apparatus 1 are capable of receiving and reproducing the content from the broadcasting apparatus 5 in a synchronous manner. It is to be noted that the broadcasting apparatus 5 is capable of transmitting a content to the communication apparatus 1 by radio or wire communication. In addition, the broadcasting apparatus 5 may also transmit a content to the communication apparatus 1 by way of the communication network 2.

A standard-time information broadcasting apparatus 6 is a unit for supplying information on a standard time to the communication apparatus 1. The standard time information is used for correctly synchronizing a standard-time measurement section 30, which is employed in each of the communication apparatus 1 as shown in FIG. 4 to serve as a clock, to a standard time. The standard time measured by a clock can typically be the world or Japanese standard time. It is to be noted that the standard-time information broadcasting apparatus 6 is capable of transmitting the information on a standard time to the communication apparatus 1 by radio or wire communication. In addition, the standard-time information broadcasting apparatus 6 may also transmit the information on a standard time to the communication apparatus 1 by way of the communication network 2.

In the typical communication system shown in FIG. 1, only two communication apparatus 1 are connected to each other by the communication network 2. It is also worth noting, however, that the number of communication apparatus 1 connected to the communication network 2 is not limited to two. That is to say, any plurality of communication apparatus 1 including communication apparatus 1-3 and 1-4 can be connected to each other by the communication network 2.

Next, a typical configuration of the communication apparatus 1-1 is explained in detail by referring to FIG. 4.

An output section 21 employed in the communication apparatus 1-1 includes a display unit 41 and a speaker 42. The output section 21 displays an image corresponding to a video signal received from an audio/video synthesis section 26 on the display unit 41 and outputs a sound corresponding to an audio signal received from the audio/video synthesis section 26 to the speaker 42.

The input section 22-1 includes a camera 51-1, a microphone 52-1, and a sensor 53-1. By the same token, the input section 22-2 includes a camera 51-2, a microphone 52-2, and a sensor 53-2. In the following descriptions, the input sections 22-1 and 22-2 are each referred to simply as the input section 22 in case it is not necessary to distinguish the input sections 22-1 and 22-2 from each other. In the same way, the cameras 51-1 and 51-2 are each referred to simply as the camera 51 in case it is not necessary to distinguish the cameras 51-2 and 51-2 from each other. By the same token, the microphones 52-1 and 52-2 are each referred to simply as the microphone 52 in case it is not necessary to distinguish the microphones 52-1 and 52-2 from each other. Likewise, the sensors 53-1 and 53-2 are each referred to simply as the sensor 53 in case it is not necessary to distinguish the sensors 53-1 and 53-2 from each other.

The camera 51 is a component for taking an image of the user. The image of the user can be a moving or still image. The microphone 52 is a component for collecting voices of the user and other sounds. The sensor 53 is a component for detecting information on an environment surrounding the user. The information on the environment includes the brightness, the ambient temperature, and the humidity.

The input section 22 outputs the acquired image, voices/sounds, and information on the environment to a communication section 23, a storage section 27, and a data analysis section 28 as RT (Real Time) data of the user. In addition, the input section 22 also outputs the acquired user image and user voices to the audio/video synthesis section 26.

It is to be noted that a plurality of input sections 22 can also be provided, being oriented toward a plurality of respective users. In the case of the communication apparatus 1-1 shown in FIG. 4, for example, two input sections 22 are provided, being oriented toward the two users A and B shown in FIG. 1.

The communication section 23 is a unit for transmitting real-time data input by the input section 22 as data of the users A and/or B to the communication apparatus 1-2 serving as a communication partner by way of the communication network 2 and receiving real-time data of the user X from the communication apparatus 1-2. The communication section 23 supplies the real-time data of the user X to the audio/video synthesis section 26 and the storage section 27. In addition, the communication section 23 also receives a content transmitted by the communication apparatus 1-2 or the content-providing server 3 by way of the communication network 2 and supplies the content to a content reproduction section 25 and the storage section 27. Such a content is also referred to hereafter as content data. The communication section 23 transmits a content and information to the communication apparatus 1-2 by way of the communication network 2. The content is a content read out from the storage section 27 and the information is operation information and control information generated by an operation-information output section 87.

A broadcast receiver section 24 is a unit for receiving a television broadcast signal broadcasted by the broadcasting apparatus 5 and supplying a broadcasted program conveyed by the signal as a content to the content reproduction section 25 and, if necessary, to the storage section 37. The content reproduction section 25 is a unit for reproducing a content, which is a broadcasted program received by the broadcast receiver section 24. The reproduced content may also a content received by the communication section 23, a content read out from the storage section 27, or a content read out from a disk such as an optical disk. It is to be noted that the disk itself is not shown in the figure. The content reproduction section 25 supplies a sound and image of the reproduced content to the audio/video synthesis section 26 and the image analysis section 28.

The audio/video synthesis section 26 is a unit for mixing an image and sound received from the content reproduction section 25 as an image and sound of a content, an image and voice received from the input section 22 as an image and voice of the user A, an image and voice received from the communication section 23 as an image and voice of the user X as well as a character string for typically arousing the alert for the user A and supplying a video signal obtained as a analysis result to the output section 21. Referred to hereafter as a synthesis process, the mixing process carried out by the audio/video synthesis section 26 is a process of blending and adjusting images, sounds, voices, and character strings.

The storage section 27 includes a content storage section 61, a license storage section 62, a user-information storage section 63, and the synthesis-information storage section 64 mentioned before. The content storage section 61 is a unit for storing data received from the input section 22 as real-time data of a user such as the user A, data received from the communication section 23 as real-time data of the communication partner such as the user X, a broadcast program received from the broadcast receiver section 24 as a content, and a content received from the communication section 23. The license storage section 62 is a unit for storing information such as a license granted to the communication apparatus 1-1 as a license for utilizing a content stored in the content storage section 61. The user-information storage section 63 is a unit for storing data such as information on privacy of a group to which the communication apparatus 1-1 pertains. The synthesis-information storage section 64 is a unit for storing each synthesis pattern and every synthesis parameter, which can be changed by a synthesis control section 84.

Composed of a user-characteristic analysis section 71 and a control-information generation section 72, the data analysis section 28 is a unit for inputting data received from the input section 22 as real-time data of a user such as the user A, data received from the communication section 23 as real-time data of the communication partner such as the user X, and a content received from the content reproduction section 25.

The user-characteristic analysis section 71 is a unit for analyzing characteristics of information including the posture of each user, the number of users, voices of each user, and the condition of users and supplying the analysis result to the control-information generation section 72. The condition of users is information on an environment surrounding each of the users. The information, the characteristics of which are analyzed, is information obtained from data received from the input section 22 as real-time data of the users including the user A. In addition to the characteristics of the information, the user-characteristic analysis section 71 also analyzes characteristics of other information and supplying the analysis result to the control-information generation section 72. The other information is information obtained from data received from the communication section 23 as real-time data of a user such as the user X.

The control-information generation section 72 is a unit for generating control information used for executing control of sections employed in the communication apparatus 1-1 in accordance with the analysis results received from the user-characteristic analysis section 71 and outputting the control information to the control section 32. For example, the control-information generation section 72 generates control information to be used for executing control of the audio/video synthesis section 26 and outputs the control information to the control section 32. In this case, the audio/video synthesis section 26 is controlled to synthesize an image and voice of data received from the communication section 23 as real-time data of the communication partner such as the user X and an image and sound of a content received from the content reproduction section 25 on the basis of synthesis parameters and synthesis pattern according to the analysis result received from the user-characteristic analysis section 71.

In addition, the control-information generation section 72 also generates control information to be used for executing control of sections employed in the communication apparatus 1-2, which serves as the communication partner, in accordance with the analysis results received from the user-characteristic analysis section 71 and outputs the control information to the control section 32.

A communication-environment detection section 29 is a unit for monitoring an environment of communication with the communication apparatus 1-2 through the communication section 23 and the communication network 2 and outputting a result of the monitoring to the control section 32. The environment of communication includes a communication rate and a communication delay time. A standard-time measurement section 30 is a unit for adjusting a standard time measured by itself on the basis of a standard time received from the standard-time information broadcasting apparatus 6 and supplying the adjusted standard time to the control section 32. An operation input section 31 is typically a remote controller for accepting an operation carried out by the user and issuing a command corresponding to the operation to the control section 32.

The control section 32 is a unit for controlling other components of the communication apparatus 1-1 on the basis of information such as a signal representing an operation received by the operation input section 31 as an operation carried out by the user and control information received from the data analysis section 28. The control section 32 includes a session management section 81, a viewing/listening recording level setting section 82, a reproduction synchronization section 83, the aforementioned synthesis control section 84, a reproduction permission section 85, a recording permission section 86, the operation-information output section 87 mentioned above, and an electronic-apparatus control section 88. It is to be noted that, in the typical configuration shown in FIG. 4, control lines used for outputting control commands from the control section 32 to other components of the communication apparatus 1-1 are omitted.

The session management section 81 is a unit for controlling a process carried out by the communication section 23 to connect the communication apparatus 1-1 to other apparatus such as the communication apparatus 1-2, the content-providing server 3, and the authentication server 4 through the communication network 2. In addition, the session management section 81 also determines whether or not to accept control information received from another apparatus such as the communication apparatus 1-2 as information used for controlling sections employed in the communication apparatus 1-1.

The viewing/listening recording level setting section 82 is a unit for determining whether or not real-time data acquired by the input section 22 and/or a content stored in the content storage section 61 as a personal content of the user can be reproduced and recorded by the communication apparatus 1-2, which serves as the communication partner, on the basis of an operation carried out by the user. If the real-time data and/or the personal content are determined to be data and/or a content that can be recorded by the communication apparatus 1-2, the maximum number of times the data and/or the content can be recorded and other information are set. This set information is added to the real-time data of the user as privacy information and transmitted to the communication apparatus 1-2 from the communication section 23. The reproduction synchronization section 83 is a unit for controlling the content reproduction section 25 to reproduce a content common to the communication apparatus 1-2 synchronously with the communication apparatus 1-2, which serves as the communication partner.

The synthesis control section 84 is a unit for controlling the data analysis section 28 to analyze user-condition information, which is obtained from real-time data of the user, on the basis of an operation carried out by the user. In addition, the synthesis control section 84 also controls the audio/video synthesis section 26 to synthesize an image of a content with images of users and synthesize a voice of a content with voices of users in accordance with an operation carried out by the user or control information received from the data analysis section 28. That is to say, on the basis of the control information received from the data analysis section 28, the synthesis control section 84 changes setting of the synthesis pattern to any of the patterns shown in FIGS. 3A to 3C and setting of synthesis parameters of the newly set synthesis pattern. The synthesis control section 84 then controls the audio/video synthesis section 26 in accordance with the newly set synthesis pattern and synthesis parameters. In addition, the synthesis control section 84 records the newly set synthesis pattern and synthesis parameters in the synthesis-information storage section 64 as synthesis information.

The reproduction permission section 85 is a unit for outputting a determination result as to whether or not a content can be reproduced on the basis of information such as a license attached to the content and/or the privacy information set by the viewing/listening recording level setting section 82 employed in the communication partner and controlling the content reproduction section 25 on the basis of the determination result. The recording permission section 86 is a unit for outputting a determination result as to whether or not a content can be recorded on the basis of information including a license attached to the content and/or the privacy information and controlling the storage section 27 on the basis of the determination result.

The operation-information output section 87 is a unit for generating operation information for an operation carried out by the user and transmitting the information to the communication apparatus 1-2 serving as the communication partner by way of the communication section 23. The operation carried out by the user can be an operation to change a channel to receive a television broadcast, an operation to start a process to reproduce a content, an operation to end a process to reproduce a content, an operation to reproduce a content in a fast-forward process, or another operation. The operation information includes a description of the operation and a time at which the operation is carried out. Details of the operation information will be described later. The operation information is used in synchronous reproduction of a content. In addition, the operation-information output section 87 also transmits control information received from the data analysis section 28 to the communication apparatus 1-2 by way of the communication section 23.

The electronic-apparatus control section 88 is a unit for setting the output of the output section 21, setting the input of the input section 22, and controlling a predetermined electronic apparatus, which is connected to the communication apparatus 1-1 as a peripheral, on the basis of an operation carried out by the user or control information received from the data analysis section 28. Examples of the predetermined electronic apparatus are an illumination apparatus and an air-conditioning apparatus, which are not shown in the figure.

It is to be noted that, since a detailed typical configuration of the communication apparatus 1-2 is the same as that of the communication apparatus 1-1 shown in FIG. 4, no special explanation of the detailed typical configuration of the communication apparatus 1-2 is given.

Next, remote communication processing carried out by the communication apparatus 1-1 to communicate with the communication apparatus 1-2 is explained by referring to a flowchart shown in FIG. 5 as follows. It is to be noted that the communication apparatus 1-2 also carries out this processing in the same way as the communication apparatus 1-1.

The remote communication processing to communicate with the communication apparatus 1-2 is started when an operation to start the remote communication is carried out by the user on the operation input section 31 and an operation signal corresponding to the operation is supplied by the operation input section 31 to the control section 32.

The flowchart shown in the figure begins with a step S1 at which the communication section 23 establishes a connection with the communication apparatus 1-2 through the communication network 2 on the basis of control executed by the session management section 81 in order to notify the communication apparatus 1-2 that a remote communication is started. Then, the flow of the processing goes on to a step S2. In response to this notification, the communication apparatus 1-2 returns an acknowledgement of the notification to the communication apparatus 1-1 as an acceptance of the start of the remote communication.

At the step S2, the communication section 23 starts transmitting real-time data of the user A and other real-time data, which are received from the input section 22, by way of the communication network 2 on the basis of control executed by the control section 32. The communication section 23 also starts receiving real-time data of the user X from the communication apparatus 1-2. Then, the flow of the processing goes on to a step S3. At that time, data received from the input section 22 as the real-time data of the user A and the other real-time data as well as real-time data received from the communication apparatus 1-2 as the real-time data of the user X are supplied to the data analysis section 28. An image and voice included in the real-time data of the user A and an image and voice included the other real-time data as well as an image and voice included in the real-time data of the user X are supplied to the audio/video synthesis section 26.

At the step S3, the communication section 23 establishes a connection with the authentication server 4 through the communication network 2 on the basis of control, which is executed by the session management section 81, in order to carry out an authentication process for acquiring a content. After the authentication process has been completed successfully, the communication section 23 makes an access to the content-providing server 3 through the communication network 2 in order to acquire a content specified by the user. Then, the flow of the processing goes on to a step S4. In the mean time, the communication apparatus 1-2 carries out the same processes as the communication apparatus 1-1 to obtain the same content.

It is to be noted that, if the specified content is a content to be received as a television broadcast or an already acquired content stored in the storage section 27 and ready for reproduction, the process of the step S3 can be omitted.

At the step S4, the content reproduction section 25 starts a process to reproduce the content synchronized with the communication apparatus 1-2 on the basis of control executed by the reproduction synchronization section 83. Then, the flow of the processing goes on to a step S5. By carrying out the process to reproduce the content synchronized with the communication apparatus 1-2, the communication apparatus 1-1 and 1-2 reproduce the same content in a synchronous manner on the basis of a standard time supplied by the standard-time measurement section 30 (or the standard-time information broadcasting apparatus 6). The reproduced content is supplied to the audio/video synthesis section 26 and the data synthesis section 28.

At the step S5, the storage section 27 starts a remote communication recording process. Then, the flow of the processing goes on to a step S6. To put it concretely, the audio/video synthesis section 26 synthesizes the content, the reproduction of which has been started, the images and voices included in the input real-time data of the user A, and the other input real-time data as well as the image and voices included in the received real-time data of the user X in accordance with control executed by the synthesis control section 84. Then, the audio/video synthesis section 26 supplies audio and video signals obtained as a analysis result process to the output section 21. It is to be noted that, at that time, the synthesis control section 84 controls the synthesis process, which is carried out by the audio/video synthesis section 26, on the basis of a synthesis pattern and synthesis parameters for the pattern. As described earlier, the synthesis pattern and synthesis parameters for the pattern have been set in advance in accordance with an operation carried out by the user.

The output section 21 displays an image based on the video signal supplied thereto and generates a sound based on the received audio signal. At this stage, exchanges of an image and a voice between the users and a process to reproduce a content in a synchronous manner have been started.

Then, the start of the exchanges of an image and a voice between the users and the process to reproduce a content in a synchronous manner is followed by a start of a process to record the content, the reproduction of which has been started, the images and voices included in the real-time data of the user A and the other real-time data as well as the images and voices included in the real-time data of the user X, and synthesis information including the synthesis pattern and the synthesis parameters set for the synthesis pattern.

At the step S6, in accordance with control executed by the synthesis control section 84, the data analysis section 28 and the audio/video synthesis section 26 carry out a user-characteristic analysis mixing process, details of which will be described later. To be more specific, at the step S6, the data analysis section 28 analyzes information on the conditions of users. Obtained from real-time data of each user, the information on the conditions of users includes information on the posture of each user, the number of users, a voice of each user, and information on the environment surrounding each user. Then, the data analysis section 28 generates control information, which is used for controlling sections including the audio/video synthesis section 26, on the basis of the analysis result. In this way, the synthesis control section 84 carries out a process to control synthesis processing executed by the audio/video synthesis section 26 by changing the synthesis pattern to another and properly setting synthesis parameters of the new synthesis pattern on the basis of the control information in place of a synthesis pattern determined in advance in accordance with an operation performed by the user and synthesis parameters set in advance for the determined synthesis pattern.

Then, at the next step S7, the control section 32 produces a determination result as to whether or not the user has carried out an operation to make a request for termination of the remote communication. The control section 32 carries out the process of this step repeatedly until the user carries out such an operation. As the determination result produced at the step S7 indicates that the user has carried out an operation to make a request for termination of the remote communication, the flow of the processing goes on to a step S8.

At the step S8, the communication section 23 establishes a connection with the communication apparatus 1-2 through the communication network 2 on the basis of control, which is executed by the session management section 81, in order to notify the communication apparatus 1-2 that a remote communication has been ended. In response to this notice, the communication apparatus 1-2 returns an acknowledgement of the notification to the communication apparatus 1-1 as an acceptance of the termination of the remote communication.

Then, at the next step S9, the storage section 27 terminates the remote-communication-recording process. It is to be noted that, in this way, when a next remote communication is carried out later on, it is possible to utilize the stored data of the terminated remote communication. The stored data of the terminated remote communication includes the reproduced content, the images and voices included in the real-time data of the user A and the other real-time data as well as the images and voices included in the real-time data of the user X, and the synthesis information described above.

The processing of the remote communication processing carried out by the communication apparatus 1-1 as communication processing between the communication apparatus 1-1 and the communication apparatus 1-2 has been explained above.

The following description explains details of the aforementioned user-characteristic analysis mixing process carried out at the step S6 of the flowchart representing the remote communication processing described above.

Figure 6:
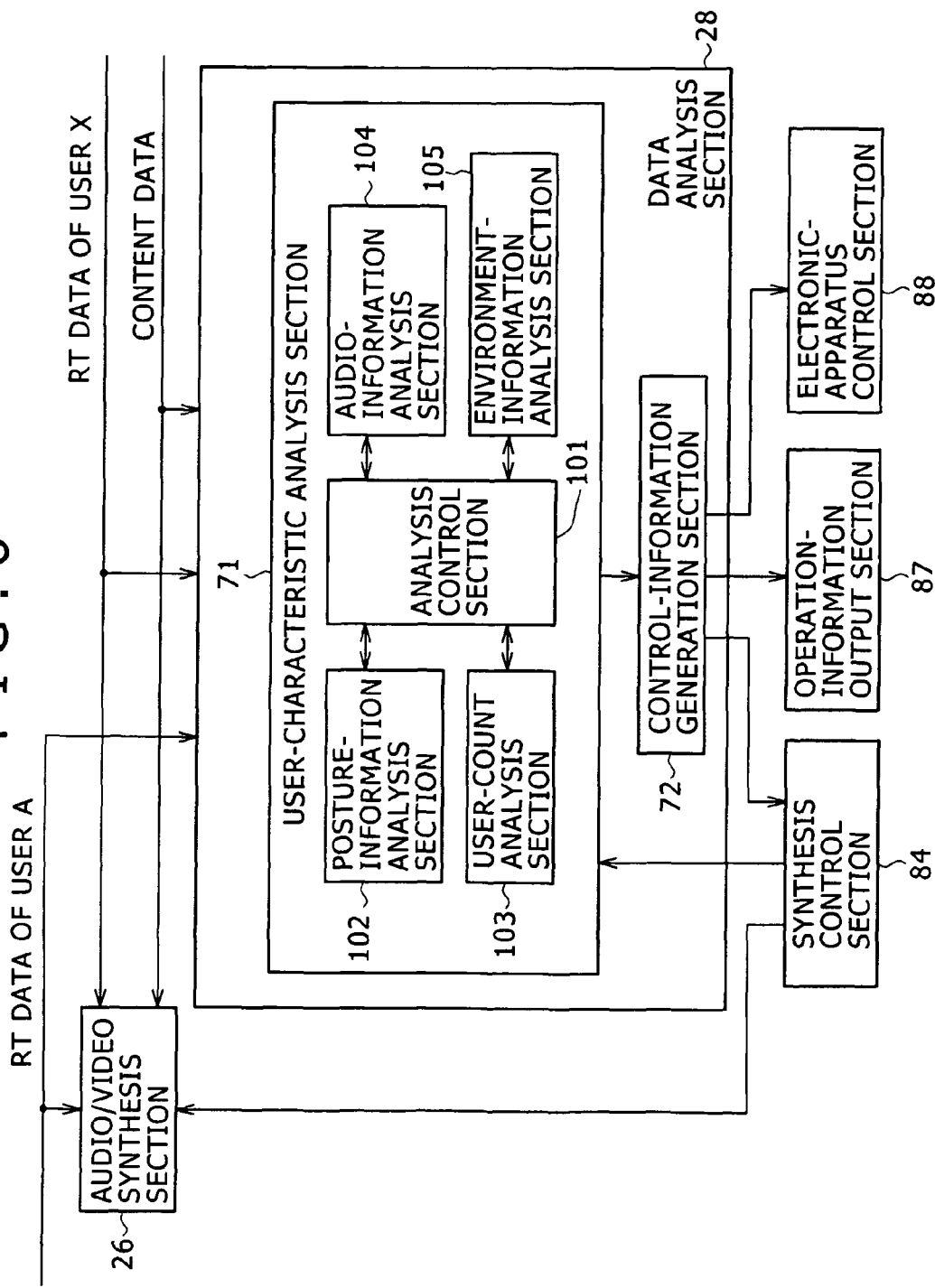
FIG. 6 is a block diagram showing a detailed typical configuration of a data analysis section employed in the communication apparatus shown in FIG. 4.

FIG. 6 is a block diagram showing a detailed configuration of the data analysis section 28 for carrying out the user-characteristic analysis mixing process. It is to be noted that, specific configuration sections shown in FIG. 6 as sections identical with their respective counterparts employed in the configuration shown in FIG. 4 are denoted by the same reference numerals as the counterparts and description of the specific configuration sections is omitted to avoid duplications.

As shown in FIG. 6, a typical configuration of the user-characteristic analysis section 71 includes an analysis control section 101, a posture-information analysis section 102, a user-count analysis section 103, an audio-information analysis section 104 and an environment-information analysis section 105.

The analysis control section 101 is a unit for controlling sections, which are provided for analyzing information, in accordance with control executed by the synthesis control section 84, to analyze condition information (or characteristics) of users and supplying the analysis result to the control-information generation section 72. The sections provided for analyzing information are the posture-information analysis section 102, the user-count analysis section 103, the audio-information analysis section 104 and the environment-information analysis section 105. The condition information (or characteristics) of users is information obtained from real-time data of the users as real-time data to be analyzed. The real-time data to be analyzed is data extracted from input real-time data of the user A and received real-time data of the user X.

The posture-information analysis section 102 is a unit for carrying out an analysis process based on information on front, rear, right and left-leaning postures of the user and supplying the analysis result process to the analysis control section 101. The information on forward, backward, right and left-leaning postures of the user is information extracted from an image included in the real-time data of the user as real-time data to be analyzed. The user-count analysis section 103 is a unit for analyzing the number of users, who participate in the remote communication, on the basis of the input real-time data, and supplying the analysis result to the analysis control section 101. The audio-information analysis section 104 is a unit for carrying out an analysis process based on audio information extracted from sounds included in the real-time data to be analyzed and supplying the analysis result to the analysis control section 101. Examples of the audio information are the volume and frequency of a sound.

The environment-information analysis section 105 is a unit for carrying out an analysis process based on information on an environment surrounding the user and supplying the analysis result to the analysis control section 101. Extracted from the real-time data to be analyzed, the information on an environment surrounding the user includes brightness and an ambient temperature. It is to be noted that, in addition to the brightness and the ambient temperature, the information on an environment surrounding the user may also include humidity, an acceleration of a movement of the communication apparatus 1-1, the position of the communication apparatus 1-1 and a time of the movement. In this case, the input section 22 may be provided with a sensor for each item of the input information on an environment surrounding the user. As an alternative, the communication apparatus 1-1 is provided with an internal GIS (Geographical Information System) function.

On the basis of analysis results produced in accordance with control executed by the analysis control section 101, the control-information generation section 72 generates control information to be used for controlling processes carried out by sections employed in the communication apparatus 1-1. The control-information generation section 72 then supplies the control information to the synthesis control section 84 or the electronic-apparatus control section 88. In addition, also on the basis of analysis results received from the analysis control section 101, the control-information generation section 72 generates control information to be used for controlling processes carried out by sections employed in the communication apparatus 1-2. In this case, the control-information generation section 72 supplies the control information to the operation-information output section 87.

Figure 7:
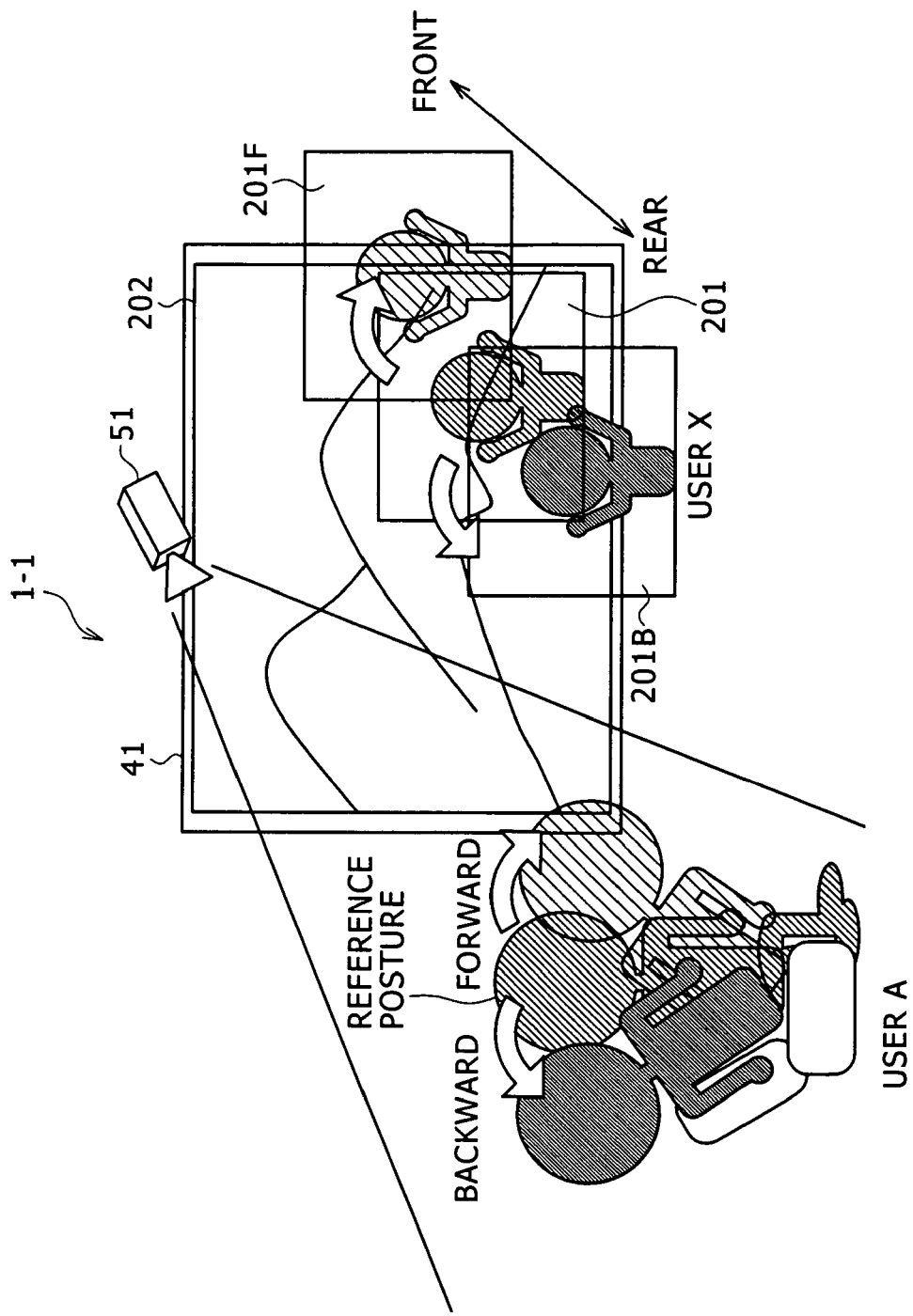
FIG. 7 is a diagram referred to in explaining a typical method of analyzing information on conditions of users.
Figure 8:
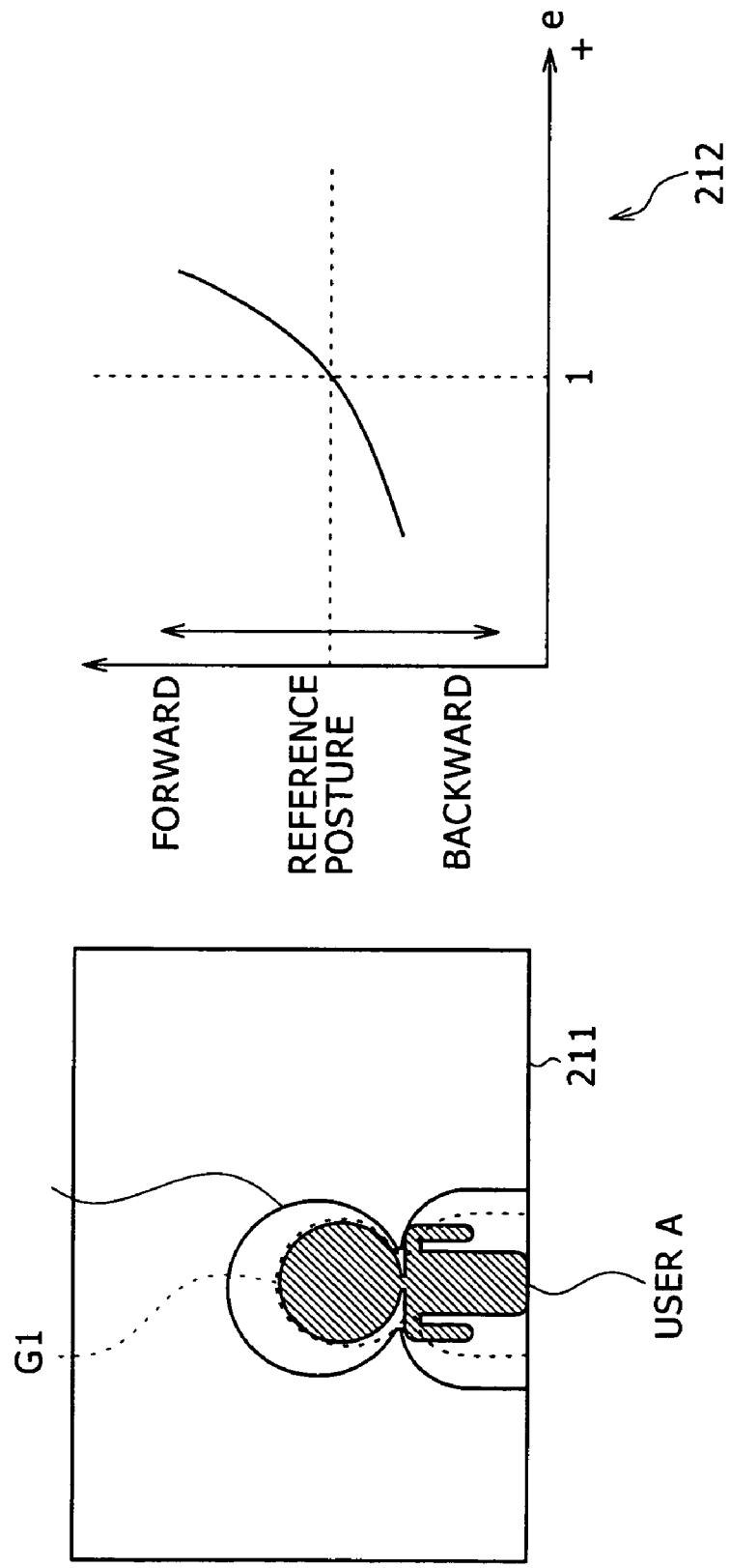
FIG. 8 is another diagram referred to in explaining the typical method of analyzing the information on conditions of users.

By referring to FIGS. 7 and 8, the following description concretely explains a method to analyze information on the condition of a user by using real-time data in the user-characteristic analysis mixing process. It is to be noted that examples of FIGS. 7 and 8 show processing carried out by the control-information generation section 72 to generate control information on the basis of an analysis result performed by the posture-information analysis section 102.

In the example shown in FIG. 7, the user A utilizes the communication apparatus 1-1 to adopt the picture-in-picture method explained earlier by referring to FIG. 3A as a method for carrying out the remote communication recording process at the step S5 of the flowchart shown in FIG. 5 to communicate with the user X operating the communication apparatus 1-2.

Thus, the input section 22 employed in the communication apparatus 1-1 is used to acquire real-time data including an image and voice of the user A, brightness as well as an ambient temperature and transmit the data to the communication apparatus 1-2 by way of the communication section 23. On the other hand, the communication apparatus 1-2 transmits the real-time data of the user X to the communication section 23 employed in the communication apparatus 1-1. It is to be noted that FIG. 7 shows the camera 51 as the input section 22.

Then, the display unit 41 employed in the communication apparatus 1-1 displays an image of the user X serving as the communication partner on a child screen 201 superposed on an image 202 of a content being reproduced at the right bottom corner of the full screen. It is to be noted that the transparency of the child screen 201 is set at a standard transparency prior to the start of the user-characteristic analysis mixing process.

At that time, the user A carries out an operation to start the user-characteristic analysis mixing process by using the operation input section 31.

The user-characteristic analysis section 71 has received real-time data of the users A and X. The posture-information analysis section 102 employed in the user-characteristic analysis section 71 extracts contour information G1 from an image 211 taken by the camera 51 as shown in FIG. 8 as an image included in the real-time data of the user A. Then, the posture-information analysis section 102 analyzes the extracted contour information G1 to determine whether the forward/backward-leaning posture information (or information on characteristics of the posture) of the user A is information indicating a forward or backward-leaning posture by comparison of the extracted contour information G1 with a reference contour G0 of the user A. That is to say, the posture-information analysis section 102 analyzes the extracted contour information G1 to determine whether the posture information of the user A is a forward or backward-leaning posture, which is displayed by the user A as a posture with respect to the display unit 41. In this way, the posture-information analysis section 102 is capable of recognizing the level of enthusiasm expressed by the user A as an enthusiasm for the content being reproduced. The forward/backward-leaning posture displayed by the user A is a posture inclining in the forward or backward direction.

Then, the control-information generation section 72 generates control information, which will be used for controlling the degree of transparency of the child screen 201 displaying the image of the user X in the synthesis of images, on the basis of a result of a process carried out by the posture-information analysis section 102 to analyze the information on the posture. In addition, the control-information generation section 72 also generates control information, which will be used for controlling the balance between the volumes of the voices of the users A and X in the synthesis of sounds, on the basis of a result of a process carried out by the posture-information analysis section 102 to analyze the information on the posture.

The reference contour G0 cited above is set in advance by the posture-information analysis section 102. Typically, the reference contour G0 is set as follows. First of all, images of the user A having a reference posture are taken by using the camera 51. The reference posture is a posture in which the reference contour G0 is set. From images taken by the camera 51, the reference posture of the user A is then determined by adoption of a method such as a motion vector analysis. Finally, information on the reference contour G0 of the reference posture of the user A is acquired. It is to be noted that, as an alternative to the adoption of the motion vector analysis, the reference contour G0 can also be set by letting the user A confirm the user itself appearing on the display unit 41.

Then, the posture-information analysis section 102 finds a contour ratio e (=G1/G0) where symbol G0 denotes the reference-contour information of the user A and symbol G1 denotes the current-contour information of the user A. Subsequently, the posture-information analysis section 102 analyzes the computed contour e to determine whether the posture of the user A is a forward-leaning or backward-leaning posture on the basis of a graph 212 shown in FIG. 8 as follows.

The vertical axis of the right-side diagram showing the graph 212 in FIG. 8 represents information on the posture of the user A. The center of the vertical axis is the posture information corresponding to the reference posture. Posture information above the center represents forward-leaning postures and posture information below the center represents backward-leaning postures. On the other hand, the horizontal axis represents the contour ratio e. The center of the horizontal axis is the contour ratio e of 1. Contour ratios e on the right side of the center are contour ratios e greater than 1, each representing a position on the + side corresponding to forward-leaning postures. On the other hand, contour ratios e on the left side of the center are contour ratios e smaller than 1, each representing a position on the—side corresponding to backward-leaning postures.

Thus, for a contour ratio e smaller than 1, that is, for a current contour G1 of the user A smaller than the reference contour G0, the posture-information analysis section 102 determines that the posture of the user A is leaning backward in comparison with the reference posture, generating an analysis result indicating that the user A has a low level of enthusiasm for the content being reproduced. In this case, on the basis of such the analysis result, as shown by a child screen 201B displaying the image of the user X, the control-information generation section 72 lowers the degree of transparency of the child screen 201B to a value smaller than the degree of transparency of the reference child screen 201 cited earlier. That is to say, the posture-information analysis section 102 generates control information to raise the concentration of the image of the user X and increase the volume of a voice of the user X to let the user better view and listen to the user X.

If the contour ratio e is found greater than 1 or the current contour G1 of the user A is found greater than the reference contour G0 in the data analysis section 28, the posture-information analysis section 102 determines that the posture of the user A is leaning forward in comparison with the reference posture, producing an analysis result indicating that the user A has a high level of enthusiasm for the content being reproduced. In this case, on the basis of such the analysis result, as shown by a child screen 201F displaying the image of the user X, the control-information generation section 72 raises the degree of transparency of the child screen 201F to a value greater than the degree of transparency of the reference child screen 201 cited earlier. That is to say, the posture-information analysis section 102 generates control information to decrease the concentration of the image of the user X and reduce the volume of a voice of the user X to let the user better view and listen to the content.

In the case of the example shown in FIG. 7, the degree of transparency of the child screen 201 displaying the image of a communication partner is adjusted. It is to be noted, however, that instead of adjusting the degree of transparency, the size of the child screen 201 can also be adjusted.

As described above, in the case of a forward-leaning posture of the user A, the synthesis is carried out to produce a display with the image of the user X not striking. Thus, the user A is capable of easily obtaining an environment allowing a content to be viewed and listened to with ease without setting the display of the child screen by the user itself. In the case of the backward-leaning posture of the user A, on the other hand, the synthesis is carried out to produce a display with the image of the user X striking. Thus, the user A is capable of easily obtaining an environment allowing a communication with the user X to be carried out with ease.

In the case of the example shown in FIG. 8, a contour extracted from an image of the user A is analyzed to determine whether the posture of the user A is a forward or backward-leaning posture. It is to be noted, however, that the analysis method is not limited to this technique. For example, instead of extracting a counter from an image, it is possible to provide a configuration in which 2 cameras 51 are provided on the right and left sides of the display unit 41 and information on a posture is extracted by using a stereo view generated from images taken by the cameras 51 to be used in the analysis of the posture. As another alternative, it is possible to provide a configuration in which an infrared-ray sensor is installed at a location close to the display unit 41 and a 3-dimensional distance measurement method using an infrared ray is adopted to extract posture information to be analyzed.

Figure 9:
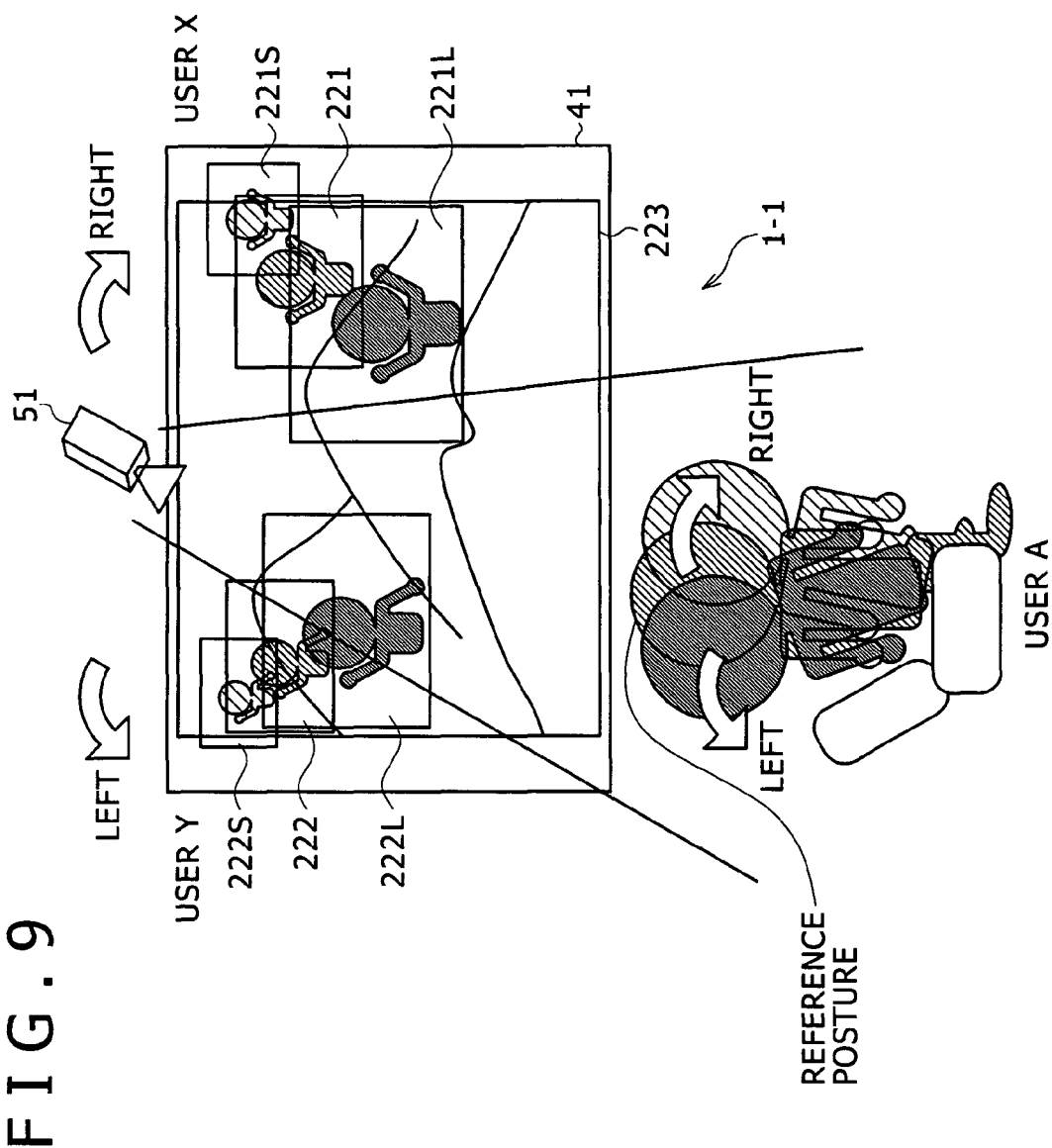
FIG. 9 is a diagram referred to in explaining another typical method of analyzing the information on conditions of users.
Figure 10:
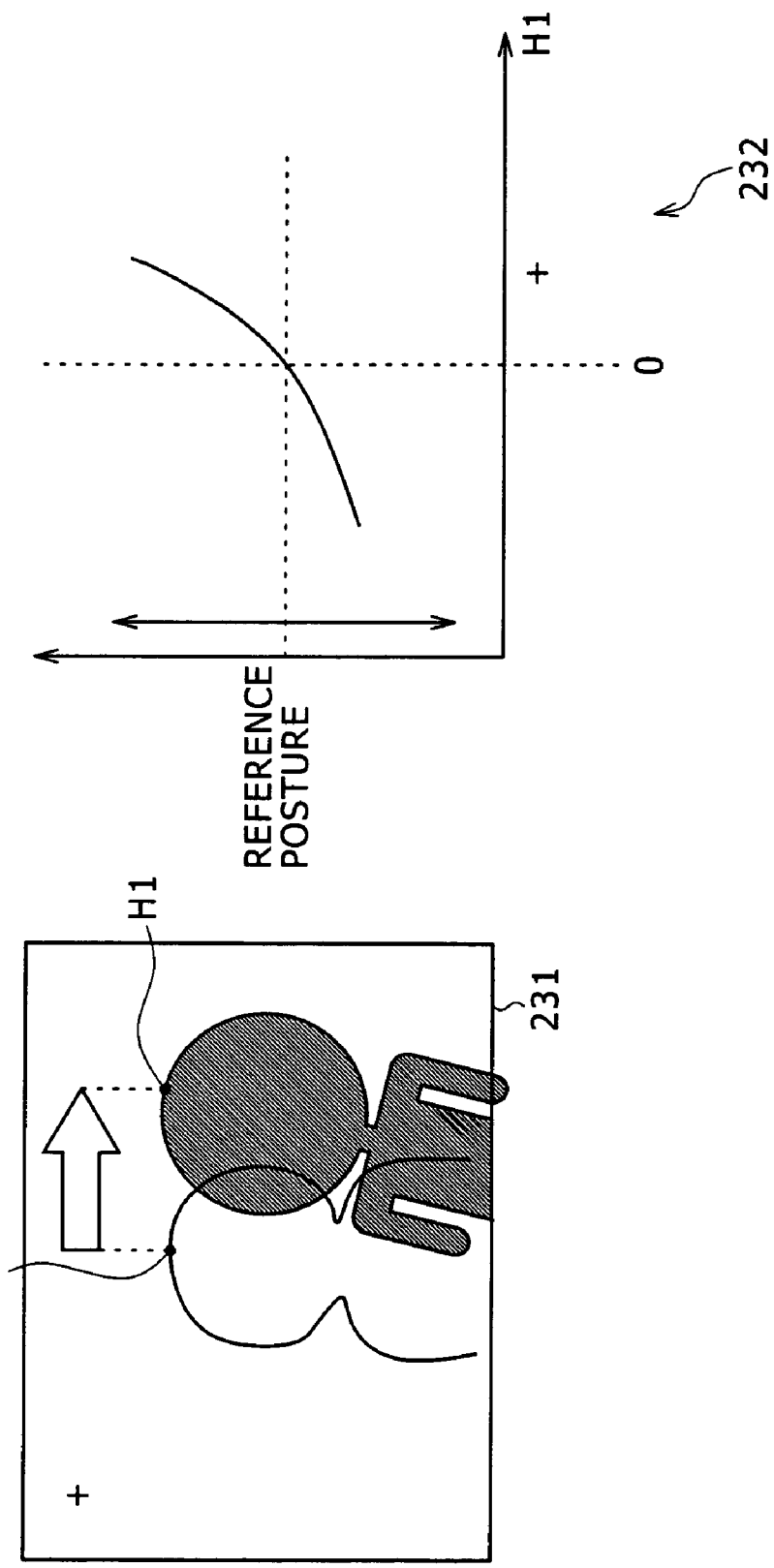
FIG. 10 is another diagram referred to in explaining the other typical method of analyzing information on conditions of users.

Next, by referring to FIGS. 9 and 10, another typical analysis method of analyzing information on the condition of a user by using the real-time data of the user is explained in concrete terms. It is to be noted that examples shown in FIGS. 9 and 10 are other examples of the processing explained earlier by referring to FIGS. 7 and 8. In the case of the examples shown in FIGS. 9 and 10, however, there are 2 communication partners, i.e., the users X and Y. Also in the case of the examples shown in FIGS. 9 and 10, the control-information generation section 72 generates control information on the basis of an analysis result carried out by the posture-information analysis section 102.

In the case of the example shown in FIG. 9, the user A utilizes the communication apparatus 1-1 to adopt the picture-in-picture method explained earlier by referring to FIG. 3A as a method for carrying out the remote communication recording process at the step S5 of the flowchart shown in FIG. 5 to communicate with the user X operating the communication apparatus 1-2 and a user Y operating another communication apparatus 1-3 shown in none of the figures.

Thus, the input section 22 employed in the communication apparatus 1-1 is used to acquire real-time data including an image and voice of the user A, brightness and an ambient temperature and transmit the data to the communication apparatus 1-2 and 1-3 by way of the communication section 23. On the other hand, the communication apparatus 1-2 and 1-3 transmit the real-time data of the users X and Y to the communication section 23 employed in the communication apparatus 1-1. It is to be noted that FIG. 9 shows the camera 51 as the input section 22.

Then, the display unit 41 employed in the communication apparatus 1-1 displays an image of the user X serving as a communication partner on a child screen 221 superposed on an image 223 of a content being reproduced on the right side on the image 223. At the same time, the display unit 41 also displays an image of the user Y serving as another communication partner on a child screen 222 superposed on the image 223 on the left side of the image 223. It is to be noted that the sizes of the child screens 221 and 222 are each set at a standard size prior to the start of the user-characteristic analysis mixing process.

At that time, the user A carries out an operation to start the user-characteristic analysis mixing process by using the operation input section 31.

The user-characteristic analysis section 71 has received real-time data of the users A, X and Y. The posture-information analysis section 102 employed in the user-characteristic analysis section 71 extracts a current head position H1 from an image 231 taken by the camera 51 as shown in FIG. 10 as an image included in the real-time data of the user A. Then, the posture-information analysis section 102 analyzes the extracted current head position H1 by comparison of the head position H1 of the user A with a reference head position H0 of the user A in order to determine whether the posture of the user A is right or left leaning. That is to say, the posture-information analysis section 102 determines whether the posture of the user A is right or left leaning with respect to the center of the screen of the display unit 41. In other words, the posture-information analysis section 102 determines whether the posture of the user A is a posture oriented in a direction toward the child screen 221 or 222. The left/right leaning posture displayed by the user A is a posture inclining in the left or right direction.

Then, the control-information generation section 72 generates control information, which will be used for controlling the sizes the child screens 221 and 222 in the synthesis of images, on the basis of a result of a process carried out by the posture-information analysis section 102 to analyze the information on the posture. In addition, the control-information generation section 72 also generates control information, which will be used for controlling the balance between the volumes of the voices of the users X and Y in the synthesis of sounds, on the basis of a result of a process carried out by the posture-information analysis section 102 to analyze the information on the posture.

The reference head position H0 is set in advance by the posture-information analysis section 102. Typically, the reference head position H0 is set in the same way as the method of setting a reference contour G0 as explained earlier by referring to FIG. 8 as follows. First of all, images of the user A having a reference posture are taken by using the camera 51. The reference posture is a reference posture in which the reference head position H0 is set as shown as a middle posture at the bottom of FIG. 9. From images taken by the camera 51, the reference posture of the user A is then recognized by adoption of a method such as a motion vector analysis. Finally, the information on the reference head position in the recognized reference posture of the user A is acquired.

The posture-information analysis section 102 analyzes the head position H1 of the user A in the current posture by comparing the head position H1 with the reference head position H0 of the user A. In the diagram for showing a graph 232 in FIG. 10, the reference head position H0 corresponds to a value of 0 on the horizontal axis.

The vertical axis of the right-side diagram showing the graph 232 in FIG. 10 represents the information on the posture. The center of the vertical axis is the posture information corresponding to the reference posture. Posture information above the center represents right-leaning postures and posture information below the center represents left-leaning postures. On the other hand, the horizontal axis represents the current head position H1 relative to the reference head position H0. The center of the horizontal axis is the reference head position H0 of 0. Head positions H1 on the right side of the center are head positions H1 greater than the reference head position H0, each representing a position on the + side corresponding to right-leaning postures. On the other hand, head positions H1 on the left side of the center are head positions H1 smaller than the reference head position H0, each representing a position on the − side corresponding to left-leaning postures. It is to be noted that, in an image 231 shown in FIG. 10 as an image of the user A, the left and right directions are opposite to the directions of the user A viewing and listening to the display 41 shown in FIG. 9. That is to say, the − side of the image 231 is the − side of the horizontal axis of the graph 232 shown in FIG. 10, representing the left side of FIG. 9 and the + side of the image 231 is the + side of the horizontal axis of the graph 232, representing the right side of FIG. 9

Thus, if the current head position H1 is smaller than 0, that is, if the current head position H1 of the user A is a position on the − side of the reference position H0, the posture-information analysis section 102 determines that the posture of the user A is left leaning with respect to the reference posture, generating an analysis result indicating that the user A is facing the screen in a direction toward the user Y displayed on the aforementioned child screen 222 on the left side on the display unit 41 showing the image of the content. In this case, on the basis of the analysis result, the control-information generation section 72 generates control information to be used for synthesizing images to display a child screen 222L at a size larger than the size of the child screen 222 as shown in the child screen 222L and control information to be used for synthesizing sounds to output the voice of the user Y at a larger volume. In addition, at the same time, the control-information generation section 72 generates control information to be used for synthesizing images to display a child screen 221S at a size smaller than the size of the child screen 221 cited earlier as shown in the child screen 221S and control information to be used for synthesizing sounds to output the voice of the user X at a smaller volume. In this way, the user A can view and listen to the user Y better than the user A views and listens to the user X.

If the current head position H1 is greater than 0, that is, if the current head position H1 of the user A is a position on the + side of the reference position H0, the posture-information analysis section 102 determines that the posture of the user A is right leaning with respect to the reference posture, generating an analysis result indicating that the user A is facing the screen in a direction toward the user X displayed on the aforementioned child screen 221 on the right side on the display unit 41 showing the image of the content. In this case, on the basis of the analysis result, the control-information generation section 72 generates control information to be used for synthesizing images to display a child screen 221L at a size larger than the size of child screen 221 as shown in the child screen 221L and control information to be used for synthesizing sounds to output the voice of the user X at a larger volume. In addition, at the same time, the control-information generation section 72 generates control information to be used for synthesizing images to display a child screen 222S at a size smaller than the size of the child screen 222 mentioned before as shown in the child screen 222S and control information to be used for synthesizing sounds to output the voice of the user Y at a smaller volume. In this way, the user A can view and listen to the user X better than the user A views and listens to the user Y.

As described above, in the case of the examples shown in FIGS. 9 and 10, if the user A has a left-leaning posture, the synthesis is carried out to produce a display with the image of the user Y striking and the image of the user X not striking. Thus, the user A is capable of easily obtaining an environment allowing a communication with the user Y to be carried out simply since the expression, body signal language and gesture of the user Y having a conversation with the user A can be seen with ease. If the user A has a right-leaning posture, on the other hand, the synthesis is carried out to produce a display with the image of the user X striking and the image of the user Y not striking. Thus, the user A is capable of easily obtaining an environment allowing a communication with the user X to be carried out simply since the expression, body signal language and gesture of the user X having a conversation with the user A can be seen with ease.

It is thus possible to provide the user with the same feeling as an actual interactive communication in which the user is facing and talking to a communication partner having a conversation with the user. As a result, a natural and lively communication can be provided.

In the case of the example shown in FIG. 10, the information on the left-leaning and right-leaning postures of the user A is analyzed by extracting the head position from an image of the user A. It is to be noted, however, that the information on the left-leaning and right-leaning postures of the user A can also analyzed by, for example, detecting information on the line of vision and information on the layout of the eyes, nose and mouth of the user A.

By referring to the examples shown in FIGS. 7 to 10, the above descriptions have explained analysis processes using user-condition information included in real-time data of the user A. In the case of the examples, the information on the condition of a user is an image of the user. However, the communication apparatus 1-1 operated by the user A can also be controlled by analyzing user condition information obtained from real-time data of another user serving as a communication partner operating another communication apparatus installed at a remote location in addition to user condition information obtained from real-time data of the user A. In this case, the real-time data of the other user is received from the other communication apparatus operated by the other user.

Figure 11:
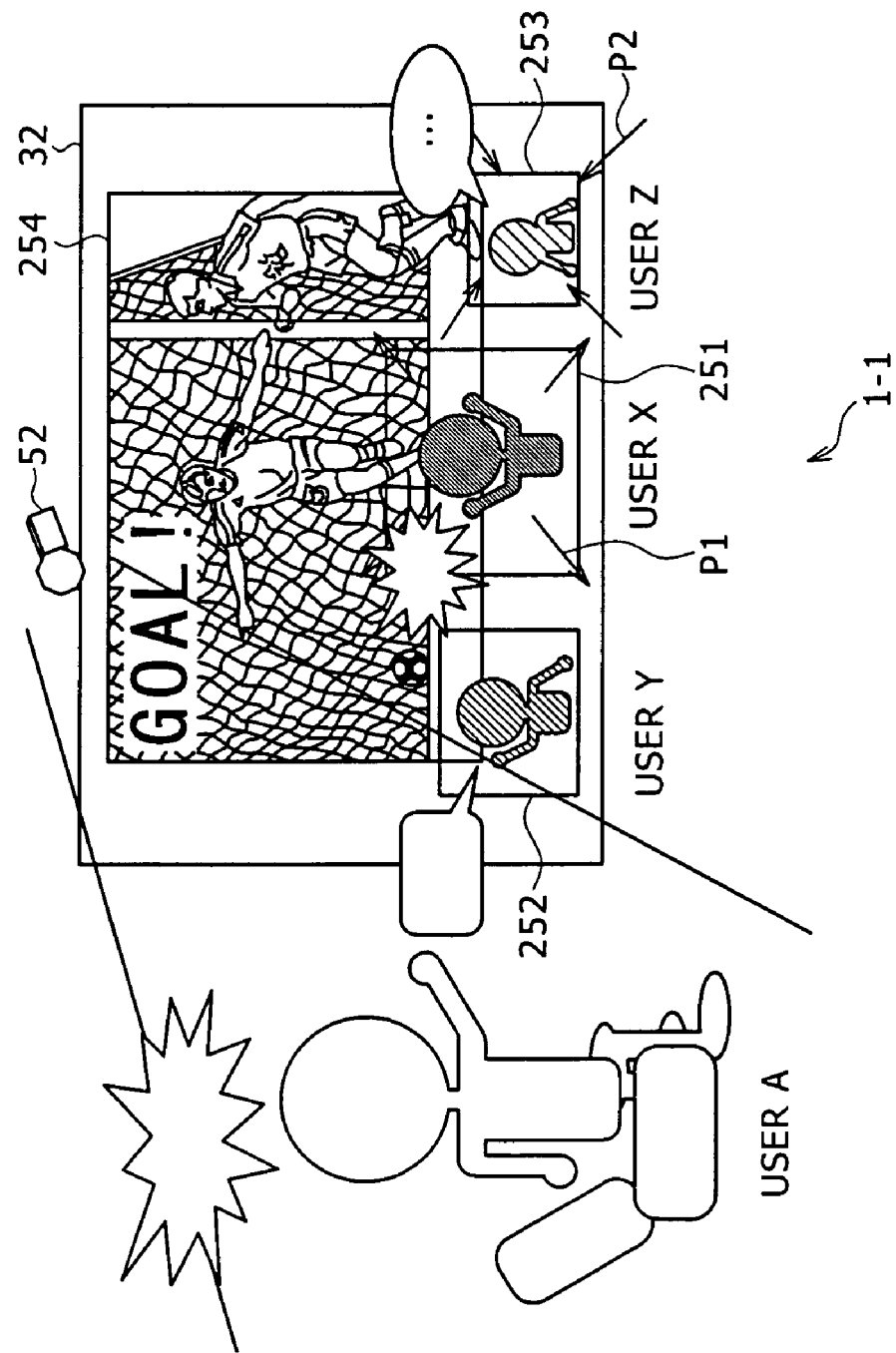
FIG. 11 is a diagram referred to in explaining a typical method of analyzing information on conditions of users by using a plurality of pieces of real-time data.
Figure 12:
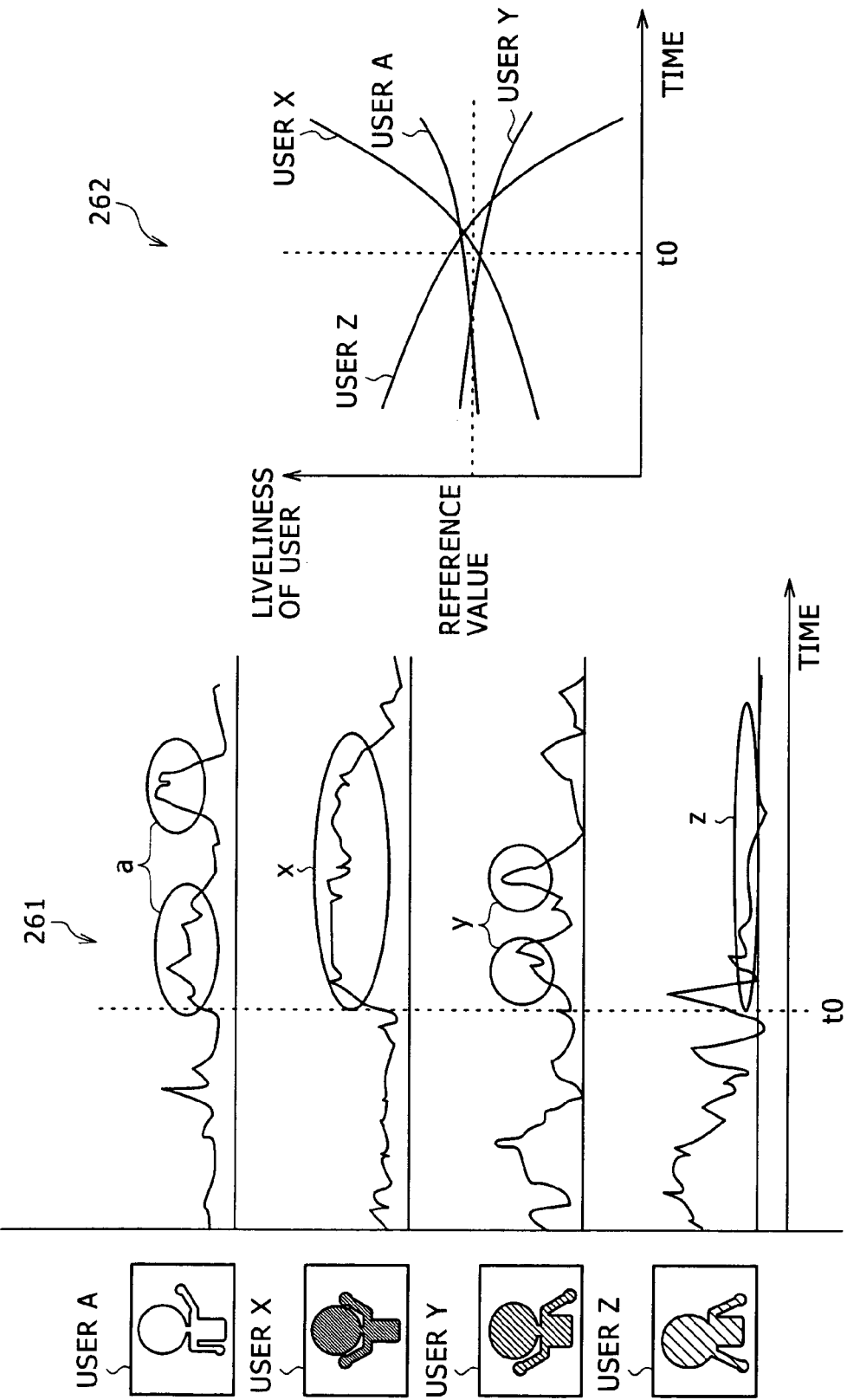
FIG. 12 is another diagram referred to in explaining the typical method of analyzing the information on conditions of users by using a plurality of pieces of real-time data.

By referring to FIGS. 11 and 12, the following description concretely explains a method to analyze information on conditions of users by using a plurality of pieces of real-time data. It is to be noted that examples shown in FIGS. 11 and 12 are typical processing carried out by the control-information generation section 72 to generate control information on the basis of results of analyses carried out by the user-count analysis section 103 and the audio-information analysis section 104.

In the example shown in FIG. 11, the user A utilizes the communication apparatus 1-1 to adopt the picture-in-picture method explained earlier by referring to FIG. 3A as a method for carrying out the remote communication recording process at the step S5 of the flowchart shown in FIG. 5 to communicate with the user X operating the communication apparatus 1-2, the user Y operating another communication apparatus 1-3 shown in none of the figures and a user Z operating a further communication apparatus 1-4 also shown in none of the figures. Thus, 4 users are involved in the remote communication recording process.

In this case, the input section 22 employed in the communication apparatus 1-1 is used to acquire real-time data including an image and voice of the user A, brightness and an ambient temperature and transmit the data to the communication apparatus 1-2 to 1-4 by way of the communication section 23. On the other hand, the communication apparatus 1-2 to 1-4 transmit the real-time data of the users X, Y and Z to the communication section 23 employed in the communication apparatus 1-1. It is to be noted that FIG. 11 shows a microphone 52 as the input section 22.

Then, the display unit 41 employed in the communication apparatus 1-1 displays an image of the user Y serving as a communication partner on a child screen 252 superposed on the image 254 of a content being reproduced on the right lower corner on the image 254, an image of the user X serving as another communication partner on a child screen 251 superposed on the image 254 on the middle lower corner of the image 254 and an image of the user Z serving as a further communication partner on a child screen 253 superposed on the image 254 on the left lower corner of the image 254.

At that time, the user A carries out an operation to start the user-characteristic analysis mixing process by operating the operation input section 31.

The user-characteristic analysis section 71 has received real-time data of the users A, X, Y and Z. The user-count analysis section 103 employed in the user-characteristic analysis section 71 analyzes the data to determine how many users are participating in the remote communication processing. In addition, the audio-information analysis section 104 employed in the user-characteristic analysis section 71 extracts audio information (or audio characteristics) such as volumes and frequency characteristics from sounds included in the real-time data of the users A, X, Y and Z. Then, the audio-information analysis section 104 analyzes the extracted volumes and frequency characteristics to determine the level of liveliness for each of the users participating in the communication, that is, the liveliness indicator of each user. Subsequently, on the basis of the determination result, the control-information generation section 72 generates control information to be used for controlling the size, degree of transparency and screen effect for each of the child screens 251 to 253 synthesized in the image of the content.

The horizontal axis of a diagram showing graphs 261 in FIG. 12 represents the lapse of time. The vertical axis represents the volume of a voice output by each of the users A, X, Y and Z. The graphs 261 arranged from the top to the bottom represent changes of the volumes of voices output by the users A, X, Y and Z respectively with the lapse of time. The higher the position of a graph, the larger the volume represented by the graph. By the same token, the horizontal axis of a diagram showing graphs 262 in FIG. 12 also represents the lapse of time. The vertical axis represents the relative level of liveliness for each of the users A, X, Y and Z at the predetermined time. The relative level of liveliness for a user is inferred on the basis of the volume of a voice output by the user. The longer the distance between a relative level of liveliness above the center of the vertical axis and the center, the higher the relative level of liveliness.

That is to say, as shown by the graphs 261, the volume of a voice output by the user A prior to a time t0 is smaller than the volumes of voices output by the users Y and Z. As shown by portions 'a' after the time t0, however, there are many periods of time in which the volume of a voice output by the user A exceeds the volumes of voices output by the users Y and Z. Thus, an analysis result indicates that, prior to the time t0 in the graphs 262, the level of liveliness for the user A is lower than a reference level but, after the time t0, the level of liveliness for the user A is higher than the reference level.

Also as shown by the graphs 261, a state in which the volume of a voice output by the user X is smaller than the volumes of voices output by the users A, Y and Z is continuous prior to the time t0. As shown by a portion 'x' after the time t0, however, a state in which the volume of a voice output by the user X is larger than the volumes of voices output by the users A, Y and Z is continuous for a long period of time. Thus, an analysis result indicates that, prior to the time t0 in the graphs 262, the level of liveliness for the user X is lower than not only the reference level, but also the levels of liveliness for the users A, Y and Z but, after the time t0, the level of liveliness for the user X is higher than not only the reference level, but also the levels of liveliness for the users A, Y and Z.

Also as shown by the graphs 261, prior to the time t0, there are many periods of times in which the volume of a voice output by the user Y is larger than the volumes of voices output by the users A and X. Except for 2 portions 'y' each showing a volume of a voice output by the user Y larger than the volumes of voices output by the users A and X, however, a state in which the volume of a voice output by the user Y is smaller than the volumes of voices output by the users A and X is continuous after the time t0. Thus, an analysis result indicates that, prior to the time t0 in the graphs 262, the level of liveliness for the user Y is higher than not only the reference level but also the levels of liveliness for the users A and X but, after the time t0, the level of liveliness for the user A is lower a little bit than the reference level.

Also as shown by the graphs 261, a state in which the volume of a voice output by the user Z is larger than the volumes of voices output by the users A, X and Y is continuous prior to the time t0. As shown by a portion 'z' after the time t0, however, a state in which the volume of a voice output by the user Z is smaller than the volumes of voices output by the users A, X and Y is continuous for a long period of time. Thus, an analysis result indicates that, prior to the time t0 in the graphs 262, the level of liveliness for the user Z is higher than not only the reference level, but also the levels of liveliness for the users A, X and Y but, after the time t0, the level of liveliness for the user Z is lower than not only the reference level, but also the levels of liveliness for the users A, X and Y.

If an analysis result indicates that a state in which the user X is continuously outputting a voice at a largest volume in comparison with those of the users A, Y and Z is sustained, the control-information generation section 72 generates control information to be used for synthesizing images in such a way that the size of the child screen 251 showing the image of the user X is made larger than the sizes of the other child screens 252 and 253 as shown by an arrow P1 in FIG. 11. If an analysis result indicates that a state in which the user Z is continuously outputting a voice at a small volume in comparison with those of the users A, X, and Y or an almost quiet state of the user Z is sustained, the control-information generation section 72 generates control information to be used for synthesizing images in such a way that the size of the child screen 253 showing the image of the user Z is made smaller or thinner than the sizes of the other child screens 251 and 252 as shown by an arrow P2.

Let us keep in mind that, for example, it is also possible to provide a configuration in which frequency characteristics are extracted from sounds included in real-time data of the users A, X, Y and Z and, if an analysis result of the extracted frequency characteristics indicates that a state in which the frequency characteristic of the user X is continuously high in comparison with those of the users A, Y and Z is sustained, the control-information generation section 72 generates control information to produce a screen effect of typically blinking the child screen 251 showing the image of the user X.

As described above, in the examples shown in FIGS. 11 and 12, the user-characteristic analysis section 71 analyzes not only audio information extracted from a voice of the user A itself, but also audio information extracted from voices of communication partners. In addition, on the basis of the analysis result, a synthesis of child screens each showing a user is controlled to typically increase the size of the child screen showing a user at the highest level of liveliness among the users participating in a communication, that is, the child screen showing a most excited user. Thus, it is possible to provide an environment allowing a communication according to the transmission condition existing at that time t0 be obtained with ease. It is of course possible to provide a configuration in which the user-characteristic analysis section 71 does not analyze audio information extracted from a voice output by the user A itself, but analyzes only audio information extracted from voices of communication partners.

In addition, in the examples shown in FIGS. 11 and 12, it is possible to provide a configuration in which, besides the information used to control the synthesis of displayed child screens, control information showing results of comparisons of voices output by the users is also generated. While the examples shown in FIGS. 11 and 12 are referred to in explanations of syntheses carried out on the basis of voices, the examples can also be referred to in explanations of syntheses carried out on the basis of other user condition information such as images. In the case of syntheses carried out on the basis of images, for example, information on the line of vision for each other user is extracted from an image included in real-time data of the other user and, on the basis of the extracted information on the line of vision for each of other users, it is possible to analyze the child screens of the users in a conversation and other attributes of the users.

It is to be noted that, as is obvious from the examples shown in FIGS. 11 and 12, an analysis of user condition information obtained from real-time data of communication partners can be said in other words to be control executed in accordance with behaviors of the communication partners and communication environments as control of the communication apparatus 1-1 operated by the user A. In consequence, an operation and effect not desired by the user A may be resulted in inadvertently. In order to get rid of such an operation and effect, as will be described later by referring to FIG. 13, the communication apparatus 1-1 operated by the user A can be set not to analyze real-time data of the other users or to limit control information generated from results of other analyses carried out on the real-time data of the other users.

In the above descriptions, the picture-in-picture method is assumed. However, the scope of the present invention is not limited to the picture-in-picture method. That is to say, the present invention can also be applied to the cross fade method explained earlier by referring to FIG. 3B, the wipe method explained before by referring to FIG. 3C and other synthesis patterns.

In addition, the above descriptions explain only syntheses of an image and voice of each communication partner with an image and sound of a content. However, an image and voice input by the input section 22 as an image and voice of the user A can also be synthesized with an image and sound of a content.

Next, the user-characteristic analysis mixing process carried out at the step S6 of the flowchart shown in FIG. 5 is explained by referring to a flowchart shown in FIG. 13 as follows.

At the step S5 of the flowchart shown in FIG. 5, a communication-recording process is started. Then, on the basis of a synthesis pattern set in advance by an operation carried out by the user and synthesis parameters also set in advance by an operation carried out by the user for the synthesis pattern, the synthesis control section 84 carries out a process to control the synthesis processing performed by the audio/video synthesis section 26. In addition, the data analysis section 28 obtains a reproduced content, input real-time data of the user A and other users and received real-time data of the user X.

Then, the user A operates the operation input section 31 to enter a command making a request for a start of the user-characteristic analysis mixing process. The operation input section 31 generates an operation signal corresponding to the operation carried out by the user A and supplies the operation signal to the synthesis control section 84. Receiving the operation signal from the operation input section 31, at the first step S21 of the flowchart shown in FIG. 13, the synthesis control section 84 produces a determination result as to whether or not to start the user-characteristic analysis mixing process. If the determination result indicates that the user-characteristic analysis mixing process is to be started, the flow of the processing goes on to a step S22 at which the synthesis control section 84 produces a determination result as to whether or not real-time data of other users is to be analyzed. If the determination result indicates that real-time data of other users is not to be analyzed, the flow of the processing goes on to a step S23.

Information as to whether or not real-time data of other users is to be analyzed has been set prior to the user-characteristic analysis mixing process. It is needless to say that, by operating the operation input section 31, the user A is capable of changing the setting of the information indicating whether or not real-time data of other users is to be analyzed.

Then, at the step S23, in accordance with control executed by the synthesis control section 84, the analysis control section 101 controls one of the user-count analysis section 103, the audio-information analysis section 104 and the environment-information analysis section 105 to analyze user condition information (or user characteristics) obtained from real-time data of the user itself, who is the user A, and supply the analysis result to the control-information generation section 72. Then, the flow of the processing goes on to a step S24.

At the step S24, the control-information generation section 72 generates control information on the basis of the analysis result received from the analysis control section 101, supplying the control information to the synthesis control section 84, the operation-information output section 87 or the electronic-apparatus control section 88. Then, the flow of the processing goes on to a step S28 at which images and voices are synthesized in accordance with the control information.

The processes carried out at the steps S23 and S24 are explained in concrete terms as follows. For example, at the step S23, the analysis control section 101 controls the posture-information analysis section 102 to extract information on a posture from an image included in the real-time data of the user A, to analyze the information on a posture in order to determine whether the posture of the user is a forward, backward, left or right-leaning posture as explained earlier by referring to FIGS. 7 to 10 and to supply the analysis result to the control-information generation section 72. On the basis of the analysis result, at the next step S24, the control-information generation section 72 generates control information to be used for controlling the audio/video synthesis section 26 for synthesizing the image and sound of a content with the image and voice of the user X serving as a communication partner and supplies the control information to the synthesis control section 84. In this case, the control information is information used for setting a synthesis pattern and synthesis parameters for the pattern.

As another example, at the step S23, the analysis control section 101 controls the environment-information analysis section 105 to analyze brightness information included the real-time data of the user A in order to produce a determination result as to whether the environment of the user A is dark or bright and supply the determination result to the control-information generation section 72. If the determination result produced by the environment-information analysis section 105 in accordance with the control executed by the analysis control section 101 indicates that the environment of the user A is dark, at the next step S24, the control-information generation section 72 generates control information to make the setting of an illumination apparatus brighter and supplies the control information to the electronic-apparatus control section 88. Normally, the illumination apparatus is provided as a peripheral of the communication apparatus 1-1 as shown in none of the figures.

In accordance with the control information, at a step S29, the electronic-apparatus control section 88 puts the illumination apparatus at bright setting in accordance with the control information received from the control-information generation section 72. In this way, for example, it is possible to get rid of a situation in which the user is viewing a content such as an animation appearing on the display unit 41 in a dark environment because the user is too much focusing attention on the content so that the user has forgotten to make the room bright and, as a result, the user feels unwell.

If the determination result produced at the step S22 indicates that real-time data of other users is also to be analyzed, on the other hand, the flow of the processing goes on to a step S25.

At the step S25, in accordance with control executed by the synthesis control section 84, the analysis control section 101 controls one of the user-count analysis section 103, the audio-information analysis section 104 and the environment-information analysis section 105 to analyze user condition information (or user characteristics) obtained from real-time data of the user itself, who is the user A, and condition information obtained from real-time data of the other users each serving as a communication partner, supplying the analysis result to the control-information generation section 72. Then, the flow of the processing goes on to a step S26.

At the step S26, the control-information generation section 72 generates control information on the basis of the analysis result received from the analysis control section 101. Then, at the next step S27, the control-information generation section 72 produces a determination result as to whether or not the generated control information is to be rejected. If the determination result indicates that the generated control information is not to be rejected, the control-information generation section 72 supplies the generated control information to the synthesis control section 84, the operation-information output section 87 or the electronic-apparatus control section 88. Then, the flow of the processing goes on to the step S28 cited before. That is to say, if control to be executed on the basis of an analysis result carried out on real-time data of the communication partners will cause an operation and/or effect not desired by the user, the generated control information can be rejected.

The processes carried out at the steps S25 to S27 are explained in concrete terms as follows. For example, at the step S25, the analysis control section 101 controls the user-count analysis section 103 and the audio-information analysis section 104 to extract the number of communication partners and audio information such as volumes and frequency characteristics from, sounds included in the real-time data of the user A and the real-time data of the communication partners, analyze the extracted audio information in order to determine the level of liveliness for each of the users participating in the communication, that is, the liveliness indicator of each user as explained earlier by referring to FIGS. 11 and 12 and supply the analysis result to the control-information generation section-72. Then, at the next step S26, on the basis of the analysis result, the control-information generation section 72 generates control information to be used for controlling the audio/video synthesis section 26 for synthesizing the image and sound of a content with the image and voice of each of the users X, Y and Z each serving as a communication partner. In this case, the control information is information used for setting a synthesis pattern and synthesis parameters for the pattern. If the generated control information is found at the next step S27 to be not information to be rejected, the control-information generation section 72 supplies the information to the synthesis control section 84.

As another example, at the step S25, the analysis control section 101 controls the audio-information analysis section 104 to analytically compare an environment sound extracted from the real-time data of the user A as a sound of an environment surrounding the user A with a voice extracted from the real-time data of a communication partner as a spoken voice of the communication partner, and supply the result of the comparison to the control-information generation section 72. If the comparison result produced by the audio-information analysis section 104 in accordance with the control executed by the analysis control section 101 indicates that the spoken voice of the communication partner is softer than the environment sound of the user A, at the next step S26, the control-information generation section 72 generates control information to increase the volume of a sound output by the speaker 42 and supplies the control information to the electronic-apparatus control section 88 if the generated control information is found at the next step S27 to be not information to be rejected. In this way, the spoken voice of the communication partner can be heard better.

Let us keep in mind that it is also possible to provide a configuration in which, at that time, the environment sound of a communication partner such as the user X is further compared analytically with the spoken voice of the user A at the step S25. If the spoken voice of the user A is found softer than the environment sound of the user X, at the next step S26, the control-information generation section 72 generates control information to increase the volume of a sound output by the speaker 42 employed in the communication apparatus 1-2 and supplies the control information to the operation-information output section 87 to be transmitted to the communication apparatus 1-2 at a step S30 to be described later. In this way, the spoken voice of the user A can be heard better by the communication partner. In addition, in place of the control information to increase the volume of a sound output by the speaker 42, control information to increase the volume of a synthesized sound can be generated instead.

Receiving the control information, at the step S29 cited before, the electronic-apparatus control section 88 puts the speaker 42 at setting to increase the volume of a sound output by the speaker 42 in accordance with the control information received from the control-information generation section 72. In this way, when a user in a noisy environment naturally speaks loudly due to the noisy environment, generating audio information indicating a loud voice of the user, for example, a communication apparatus operated by a communication partner in a quieter environment is capable of reducing the volume of the voice of the user in accordance with the audio information extracted by the communication apparatus. Conversely, when a user in a quiet environment naturally speaks softly due to the quiet environment, generating audio information indicating a soft voice of the user, on the other hand, a communication apparatus operated by a communication partner in a noisier environment is capable of increasing the volume of the voice of the user in accordance with the audio information extracted by the communication apparatus. As a result, it is possible to implement a communication suitable for the environments of the users with ease.

As a further example, at the step S25, the analysis control section 101 controls the posture-information analysis section 102 to extract information on a posture of a communication partner from images included in the real-time data of the user A and the communication partner, analyze the information on a posture and supply the analysis result to the control-information generation section 72. If the analysis result produced by the posture-information analysis section 102 in accordance with the control of the analysis control section 101 indicates that the contour of the communication partner exceeds a reference contour, that is, if the analysis result indicates that the communication partner has come closer to the display unit 41 employed in the communication apparatus 1-2, at the next step S26, the control-information generation section 72 generates control information to be used for synthesizing images in such a way that the size of a child screen for displaying the communication partner is increased, and supplies the control information to the synthesis control section 84 if the generated control information is found at the next step S27 to be not information to be rejected.

Receiving the control information, the step S28 to be described in more detail bellow, the synthesis control section 84 controls the license storage section 62 in accordance with the control information received from the control-information generation section 72. Thus, it is possible to provide an effect of making the user A interested in the fact that the communication partner has come closer to the display unit 41 employed in the communication apparatus 1-2.

The step S28 of the flowchart shown in FIG. 13 is described in more detail as follows. At this step, in accordance with the control information received from the control-information generation section 72, the synthesis control section 84 sets a synthesis pattern of the audio/video synthesis section 26 and synthesis parameters for the synthesis pattern. Then, the audio/video synthesis section 26 synthesizes the image and sound of the content with respectively the image and voice of a communication partner. Then, the flow of the processing goes on to the step S29 described earlier.

Thus, the display unit 41 employed in the output section 21 shows an image of the content and an image of a user serving as a communication partner as a result of an image synthesis according to control information generated by the control-information generation section 72 on the basis of an analysis result carried out by the user-characteristic analysis section 71. On the other hand, the speaker 42 employed in the output section 21 outputs a sound of the content and a voice of a user serving as a communication partner as a result of a sound synthesis according to control information generated by the control-information generation section 72 on the basis of an analysis result carried out by the user-characteristic analysis section 71.

In addition, a synthesis pattern updated in accordance with control information generated by the control-information generation section 72 and synthesis parameters also updated in accordance with the control information as parameters for the synthesis pattern are recorded as synthesis information along with the content, the reproduction of which has been started, the images included in the input real-time data of the user A and the other input real-time data as well as the image included in the received real-time data of the user X, the voices included in the input real-time data of the user A and the other input real-time data as well as the voice included in the received real-time data of the user X.

At the step S29 described before, in accordance with the control information received from the control-information generation section 72, the electronic-apparatus control section 88 executes control of sections composing the communication apparatus 1-1 and electronic apparatus each serving as a peripheral of the communication apparatus 1-1. For example, the electronic-apparatus control section 88 adjusts the volume set for the speaker 42 and makes the setting of a peripheral illumination apparatus brighter. Then, the flow of the processing goes on to the step S30 mentioned before.

At the step S30, the operation-information output section 87 transmits control information received from the control-information generation section 72 as control information for the communication apparatus 1-2 operated by the user X to the communication apparatus 1-2 by way of the communication section 23 and the communication network 2. Then, the flow of the processing goes on to a step S31. It is to be noted that processing carried out by the communication apparatus 1-2 receiving the control information from the communication apparatus 1-1 will be described later.

The user A may operate the operation input section 31 to enter a command making a request for an end of the user-characteristic analysis mixing process. The operation input section 31 generates an operation signal corresponding to the operation carried out by the user A and supplies the operation signal to the synthesis control section 84. At the next step S31, on the basis of such an operation signal, the synthesis control section 84 produces a determination result as to whether or not to end the user-characteristic analysis mixing process. If the determination result indicates that the user-characteristic analysis mixing process is to be ended, the user-characteristic analysis mixing process is terminated and the flow of the processing goes back to the step S6 included in the flowchart shown in FIG. 5 as a step following the step S7.

By the same token, if the determination result produced at the step S21 indicates that the user-characteristic analysis mixing process is not to be started or if the determination result produced at the step S27 indicates that the generated control information is information to be rejected, the user-characteristic analysis mixing process is terminated and the flow of the processing goes back to the step S6 included in the flowchart shown in FIG. 5 as a step following the step S7 as is the case with the determination result of the step S31 indicating that the user-characteristic analysis mixing process is to be ended. That is to say, at the step S7, the synthesis control section 84 continues to perform processing of controlling a synthesis process carried out by the audio/video synthesis section 26 on the basis of a synthesis pattern set in advance in accordance with an operation performed by the user and synthesis parameters set in advance also in accordance with an operation done by the user as parameters for the pattern till the user executes an operation to make a request for termination of the remote communication. If the determination result produced at the step S31 indicates that the user-characteristic analysis mixing process is not to be ended, on the other hand, the flow of the processing goes back to the step S22.

As described above, user condition information including an image, voice, brightness and temperature extracted from real-time data of users is analyzed and, on the basis of the analysis result, a synthesis of an image and sound of a content with an image and voice of a communication partner or setting of sections composing a control apparatus is controlled. It is thus possible to implement a communication reflecting conditions of the users in a real-time manner. As a result, it is possible to provide an effect of a face-to-face communication in spite of the fact that the users are present at locations remote from each other.

In addition, since it is also possible to easily implement various kinds of setting of these complicated communication apparatus, which are difficult for the user to set, as setting desired by the user, the labor for the setting can be eliminated.

A communication apparatus operated by a communication partner can also be controlled.

Figure 14:
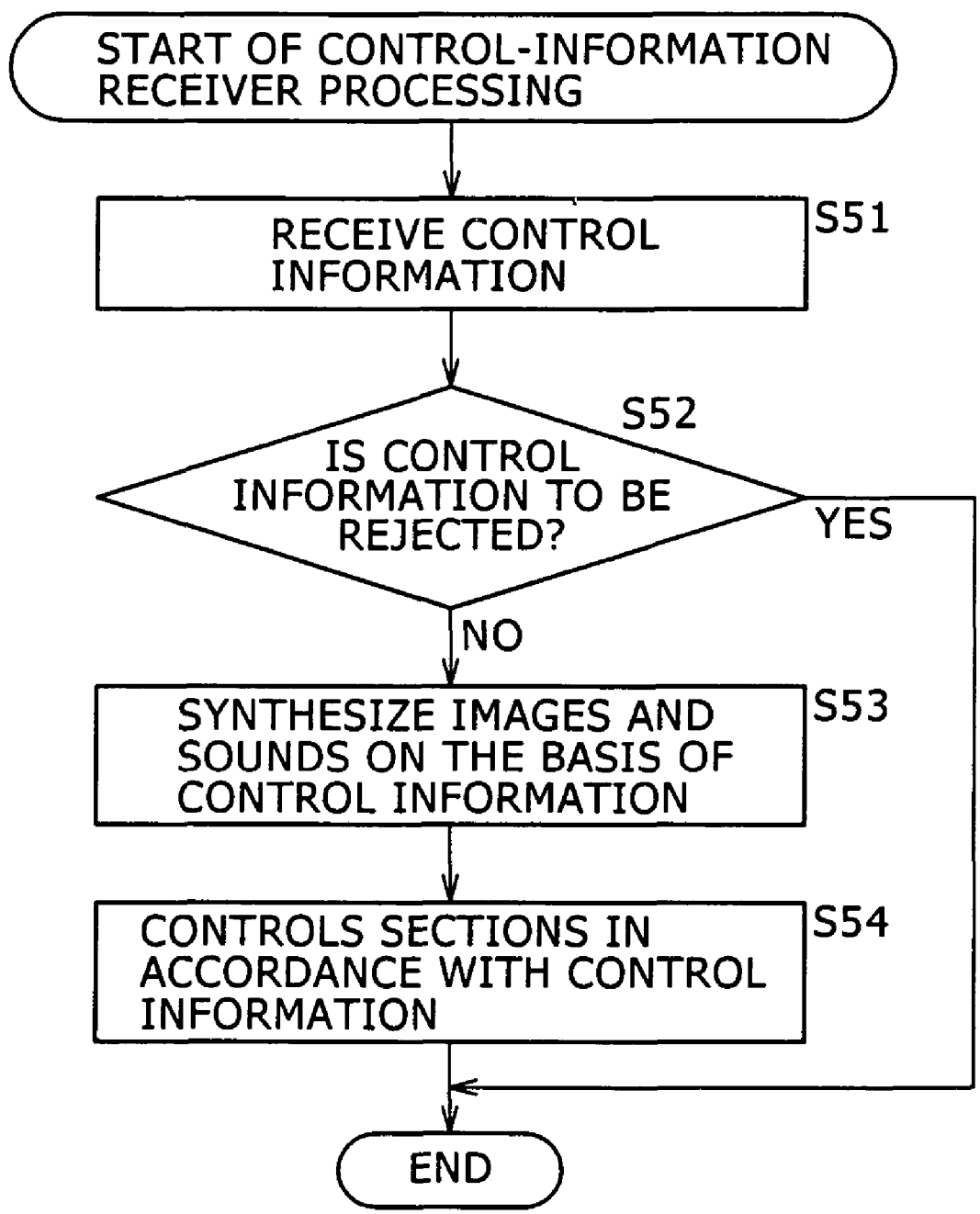
FIG. 14 shows a flowchart referred to in an explanation of a control-information receiver process carried out as a counterpart of a process performed at a step S30 of the flowchart shown in FIG. 13.

By referring to a flowchart shown in FIG. 14, the following description explains a control-information receiver process carried out by the communication apparatus 1-2 to receive control information transmitted by the communication apparatus 1-1 at the step S30 of the flowchart shown in FIG. 13.

It is to be noted that the control-information receiver process represented by the flowchart shown in FIG. 14 is a process, which is carried out by the communication apparatus 1-2 while the remote-communication recording process is being performed after the step S5 of the flowchart shown in FIG. 5. That is to say, the control-information receiver process is processing to implement a mixing process in accordance with another result provided by the communication apparatus 1-1 as a result of another analysis of content characteristics. In other words, the control-information receiver process is another type of content-characteristic analysis mixing process carried out at the step S6 of the flowchart shown in FIG. 5.

The flowchart shown in FIG. 14 begins with a step S51 at which the communication section 23 employed in the communication apparatus 1-2 receives control information from the operation information output section 87 employed in the communication apparatus 1-1 and supplies the control information to the session management section 81.

Then, at the next step S52, the session management section 81 outputs a determination result as to whether or not the control information received from the communication apparatus 1-1 is information to be rejected by determining whether or not the control information is information causing an operation and/or effect not desired by the user. If the determination result indicates that the control information received from the communication apparatus 1-1 is information to be rejected, the control-information receiver processing is ended.

Let us keep in mind that it is also possible to set the communication apparatus 1-2 to optionally accept or reject control information received from the communication apparatus 1-1 or always reject such information. In addition, it is also possible to provide a configuration in which, if control information is accepted in the communication apparatus 1-2, the communication apparatus 1-2 itself analyzes the information and priority levels are set for exclusive execution of generated control information or a master-slave relation is set in advance among the communication apparatus.

If the determination result produced by the session management section 81 at the step S52 indicates that the control information received from the communication apparatus 1-1 is not information to be rejected, on the other hand, the control information is supplied to the synthesis control section 84 or the electronic-apparatus control section 88. Then, the flow of the processing goes on to a step S53.

At the step S53, the synthesis control section 84 sets a synthesis pattern for the audio/video synthesis section 26 and synthesis parameters for the synthesis pattern in accordance with control information received from the control-information generation section 72. Then, the synthesis control section 84 controls the audio/video synthesis section 26 to synthesize an image and sound of the content with the image and voice of each user serving as a communication partner. Subsequently, the flow of the processing goes on to a step S54.

At the step S54, the electronic-apparatus control section 88 controls sections employed in the communication apparatus 1-2 and electronic apparatus each serving as a peripheral of the communication apparatus 1-2 or other equipment in accordance with the control information. Finally, the execution of the processing represented by this flowchart is ended.

As described above, it is possible to use not only control information generated by the control-information generation section 72 in accordance with an analysis result carried out by the user-characteristic analysis section 71 employed in the communication apparatus itself, but also control information generated by the control-information generation section 72 in accordance with an analysis result carried out by the user-characteristic analysis section 71 employed in another communication apparatus. In addition, the control information can also be rejected.

It is to be noted that the above descriptions assume that each communication apparatus includes a data analysis section 28. However, a server including the data analysis section 28 may also be connected to the communication network 2 to serve as an apparatus for providing control information to each communication apparatus. As an alternative, the server can also be provided with only the user-characteristic analysis section 71 so that the server is capable of giving analysis information to each communication apparatus.

Since remote communication processing is carried out as described above, more lively and natural communications can be implemented in comparison with equipment including the telephone set in related art, the TV telephone set and remote communication apparatus such as the video conference system.

That is to say, in the case of the communication in related art, the user X using a TV set in related art to view and listen to a broadcast content distributed in a real-time manner utilizes an audio telephone set to express an impression of the broadcast content viewed and listened to by the user X to the user A present at a remote location. In this case, nevertheless, it is difficult for the user A, who does not actually view and listen to the broadcast content, to understand the impression of the situation.

By using the communication apparatus according to an embodiment of the present invention, however, the users A and X present at locations remote from each other are capable of sharing the content at the same time and, in addition, the images of the users A and X can be reproduced on child screens or the like while their voices can be heard. Thus, in spite of the fact that the users A and X are present at locations remote from each other, it is possible to provide a high realistic sensation, a sense of togetherness and a sense of intimacy as if a face-to-face communication were being carried out.

By using video information extracted from an image of a user, using audio information extracted from a sound output by the user, using environment information extracted from the brightness and temperature of an environment surrounding the user and using other kinds of information, processing such as a process to synthesize the image and sound of a content and the image and sound of the user can be controlled. Thus, parameters of a communication apparatus can be set easily in accordance with conditions such as a situation faced by the user and the state of communication without taking much time and labor. As a result, more lively and natural communications can be implemented. In this case, the video information cited above includes a posture and face orientation of the user whereas the audio information mentioned above includes resounding cheers of the user and its claps.

The series of processes carried out by the communication apparatus 1 as described previously can be carried out by hardware and/or execution of software. In this case, each of the communication apparatus 1-1 and 1-2 shown in FIG. 1 is typically implemented by a personal computer 401 like one shown in FIG. 15.

In the personal computer 401 shown in FIG. 15, a CPU (Central Processing Unit) 411 is a component for carrying out various kinds of processing by execution of a variety of programs stored in advance in a ROM (Read Only Memory) 412 or loaded into a RAM (Random Access Memory) 413 from a storage section 418. The RAM 413 is also used for properly storing data by the CPU 411 in the executions of the programs.

The CPU 411, the ROM 412 and the RAM 413 are connected to each other through a bus 414. The bus 414 is also connected to an input/output interface 415.

The input/output interface 415 is connected to an input section 416, an output section 417, the storage section 418 mentioned above and a communication section 419. Used for receiving a command entered by the user, the input section 416 includes input devices such as a keyboard and a mouse, whereas the output section 417 includes a display unit for displaying an image and a speaker for outputting a generated sound. The display unit is typically a CRT (Cathode Ray Tube) display unit or an LCD (Liquid Crystal Display) unit. The storage section 418 is typically a hard-disk drive including an embedded hard disk used for storing a variety of programs and various kinds of data. The communication section 419 including a modem and a terminal adapter is a unit for carrying out radio or wire communication processing with other apparatus through a network.

The input/output interface 415 is also connected to a drive 420 on which a recording medium is mounted. Examples of the recording medium are a magnetic disk 421, an optical disk 422, a magneto-optical disk 423 and a semiconductor memory 424. If necessary, a program read out from the recording medium is installed in the storage section 418.

As explained above, the series of processes carried out by the communication apparatus 1 as described previously can be carried out by hardware and/or execution of software. If the series of processes described above is carried out by execution of software, programs composing the software can be installed into a computer embedded in dedicated hardware, a general-purpose personal computer or the like from typically a network or the recording medium described above. In this case, the computer or the personal computer serves as the communication apparatus 1 described above. By installing a variety of programs into the general-purpose personal computer, the personal computer is capable of carrying out a variety of functions. A typical general-purpose personal computer 401 is shown in FIG. 15 as described above.

As explained above, if necessary, a program read out from the recording medium as the software mentioned above is installed in the storage section 418. The recording medium itself is distributed to users separately from the main unit of the communication apparatus 1. As shown in FIG. 15, examples of the recording medium also referred to as package media are magnetic disks 421 including a flexible disk, optical disks 422 including a CD-ROM (Compact Disk-Read Only Memory) and a DVD (Digital Versatile Disk), magneto-optical disks 423 including an MD (Mini Disk) and a semiconductor memory 424. As an alternative to installation of a program from the package media into the storage section 418, the program can also be stored in advance typically in the ROM 412 or a hard disk embedded in the storage section 418.

It is worth noting that, in this specification, steps of any program represented by a flowchart described above can be carried out not only in a pre-prescribed order along the time axis, but also concurrently or individually.

It is also to be noted that the technical term 'system' used in this specification implies the configuration of a confluence including a plurality of apparatus.

It should be understood by those skilled in the art that a variety of modifications, combinations, sub-combinations, and alterations may occur depending on design requirements and other factors insofar as they are within the scope of the appended claims or the equivalents thereof.

What is claimed is:

1. An information-processing apparatus for communicating with an other information-processing apparatus, which is connected to said information-processing apparatus by a network, said information-processing apparatus comprising:
reproduction means for reproducing content data common to said information-processing apparatus and said other information-processing apparatus synchronously with said other information-processing apparatus;
user information input means for inputting first user condition information including a voice and image of a user operating said information-processing apparatus;
user information receiver means for receiving second user condition information including a voice and image of an other user from said other information-processing apparatus operated by said other user;
synthesis means for synthesizing a voice and image of said content data synchronously reproduced by said reproduction means with said voice and image of said other user received by said user-information receiver means to create a single image including both the voice and image of the content data and the voice and image of the other user such that the image of the content data extends within an area and at least part of the image of the other user is included within the area of the image of the content data, said synthesis means increasing a size of said image of said other user when a sound volume of said voice of said other user exceeds a threshold;
display means for simultaneously displaying said voice and image of said content data synthesized with said voice and image of said other user;
information analysis means for analyzing at least either said first user condition information input by said user-information input means or said second user condition information received by said user-information receiver means; and
parameter-setting means for setting a control parameter used for controlling a process, which is carried out by said synthesis means to synthesize voices and images, on the basis of an analysis result produced by said information analysis means.

2. The information-processing apparatus according to claim 1 wherein said first user condition information also includes information on the environment of said user whereas said second user condition information also includes information on the environment of said other user.

3. The information-processing apparatus according to claim 1, said information-processing apparatus further comprising analysis-object determination means for generating a determination result as to whether or not said second user condition information received by said user-information receiver means is to be analyzed by said information analysis means and, if said determination result produced by said analysis-object determination means indicates that said second user condition information is not to be analyzed by said information analysis means, said information analysis means analyzes only said first user condition information.

4. The information-processing apparatus according to claim 1, said information-processing apparatus further comprising output means for outputting a voice and an image, which are obtained as a synthesis result carried out by said synthesis means, wherein said parameter-setting means sets a control parameter of said output means on the basis of an analysis result carried out by said information analysis means.

5. The information-processing apparatus according to claim 1 wherein said parameter-setting means sets a control parameter of an electronic apparatus, which is connected to said information-processing apparatus, on the basis of an analysis result carried out by said information analysis means.

6. The information-processing apparatus according to claim 1, wherein said parameter-setting means sets a control parameter of said other information-processing apparatus on the basis of an analysis result carried out by said information analysis means, and said information-processing apparatus further comprises sender means for transmitting said control parameter set by said parameter-setting means to said other information-processing apparatus.

7. The information-processing apparatus according to claim 1, said information-processing apparatus further comprising acceptance determination means for generating a determination result as to whether or not a control parameter transmitted by said other information-processing apparatus is to be accepted.

8. An information-processing method adopted by an information-processing apparatus as a method for communicating with an other information-processing apparatus, which is connected to said information-processing apparatus by a network, said information-processing method comprising:
reproducing content data common to said information-processing apparatus and said other information-processing apparatus synchronously with said other information-processing apparatus;
inputting first user condition information including a voice and image of a user operating said information-processing apparatus;
receiving second user condition information including a voice and image of an other user from said other information-processing apparatus operated by said other user;
synthesizing a voice and image of said content data synchronously reproduced at said reproducing with said voice and image of said other user received at said receiving to create a single image including both the voice and image of the content data and the voice and image of the other user such that the image of the content data extends within an area and at least part of the image of the other user is included within the area of the image of the content data, said synthesizing including increasing a size of said image of said other user when a sound volume of said voice of said other user exceeds a threshold;
simultaneously displaying said voice and image of said content data synthesized with said voice and image of said other user;
analyzing at least either said first user condition information input at said inputting or said second user condition information received at said receiving; and
setting a control parameter used for controlling said synthesizing on the basis of an analysis result produced at said analyzing.

9. A recording medium for recording a program to be executed by a computer to perform a method for communicating with an information-processing apparatus, which is connected to said computer by a network, said method comprising:
reproducing content data common to said information-processing apparatus and said other information-processing apparatus synchronously with said other information-processing apparatus;
inputting first user condition information including a voice and image of a user operating said information-processing apparatus;

receiving second user condition information including a voice and image of an other user from said other information-processing apparatus operated by said other user;

synthesizing a voice and image of said content data synchronously reproduced at said reproducing with said voice and image of said other user received at said receiving to create a single image including both the voice and image of the content data and the voice and image of the other user such that the image of the content data extends within an area and at least part of the image of the other user is included within the area of the image of the content data, said synthesizing including increasing a size of said image of said other user when a sound volume of said voice of said other user exceeds a threshold;

simultaneously displaying said voice and image of said content data synthesized with said voice and image of said other user;

analyzing at least either said first user condition information input at said inputting or said second user condition information received at said receiving; and setting a control parameter used for controlling said synthesizing on the basis of an analysis result produced at said analyzing.

10. An information-processing apparatus for communicating with an other information-processing apparatus, which is connected to said information-processing apparatus by a network, said information-processing apparatus comprising:

a reproduction section configured to reproduce content data common to said information-processing apparatus and said other information-processing apparatus synchronously with said other information-processing apparatus;

a user information input section configured to input first user condition information including a voice and image of a user operating said information-processing apparatus;

a user information receiver section configured to receive second user condition information including a voice and image of an other user from said other information-processing apparatus operated by said other user;

a synthesis section configured to synthesize a voice and image of said content data synchronously reproduced by said reproduction section with said voice and image of said second user condition information received by said user-information receiver section to create a single image including both the voice and image of the content data and the voice and image of the other user such that the image of the content data extends within an area and at least part of the image of the other user is included within the area of the image of the content data, said synthesis section configured to increase a size of said image of said other user when a sound volume of said voice of said other user exceeds a threshold;

a display configured to simultaneously display said voice and image of said content data synthesized with said voice and image of said other user;

an information analysis section configured to analyze at least either said first user condition information input by said user-information input section or said second user condition information received by said user-information receiver section; and a parameter-setting section configured to set a control parameter used for controlling a process, which is carried out by said synthesis section to synthesize voices and images, on the basis of an analysis result produced by said information analysis section.

11. The information-processing apparatus according to claim 10, wherein said second user condition information includes information describing movement of the other user.

12. The information-processing apparatus according to claim 11, wherein said synthesis section increases a size of said image of said other user when said other user leans forward.

13. The information-processing apparatus according to claim 11, wherein said synthesis section increases a concentration of said image of said other user when said other user leans forward.

14. The information-processing apparatus according to claim 11, wherein said synthesis section increases a volume of said voice of said other user when said other user leans forward.

15. The information-processing apparatus according to claim 11, wherein said second user condition information includes information describing movement of the other user generated from real-time video of the other user.

16. The information-processing apparatus according to claim 10, wherein said second user condition information includes information describing sound volume of said voice of the other user.

17. The information-processing apparatus according to claim 16, wherein said second user condition information includes information describing sound volume of said voice of the other user generated from real-time video of the other user.

* * * * *